US008824015B2

(12) United States Patent
Kashibuchi

(10) Patent No.: US 8,824,015 B2
(45) Date of Patent: Sep. 2, 2014

(54) IMAGE PROCESSING APPARATUS, IMAGE PROCESSING METHOD, AND STORAGE MEDIUM

(71) Applicant: Canon Kabushiki Kaisha, Tokyo (JP)

(72) Inventor: Yoichi Kashibuchi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/875,200

(22) Filed: May 1, 2013

(65) Prior Publication Data

US 2013/0293928 A1 Nov. 7, 2013

(30) Foreign Application Priority Data

May 7, 2012 (JP) ................................. 2012-106121

(51) Int. Cl.
*G06K 15/00* (2006.01)
*H04N 1/405* (2006.01)
*G06K 15/02* (2006.01)

(52) U.S. Cl.
CPC ............ *G06K 15/1881* (2013.01); *G06K 15/02* (2013.01); *H04N 1/405* (2013.01)
USPC .......................................... 358/3.06; 358/3.1

(58) Field of Classification Search
CPC .... G06K 15/1881; G06K 15/02; H04N 1/405
USPC .......................................... 358/3.06, 3.1, 1.9
See application file for complete search history.

(56) References Cited

U.S. PATENT DOCUMENTS 7,733,534 B2 * 6/2010 Murakami .................... 358/3.13
8,130,410 B2 * 3/2012 Gotoh ............................ 358/1.2

FOREIGN PATENT DOCUMENTS

JP 4-336859 A 11/1992
JP 2004-170755 A 6/2004

* cited by examiner

*Primary Examiner* — Douglas Tran
(74) *Attorney, Agent, or Firm* — Canon USA Inc IP Division

(57) ABSTRACT

An image processing apparatus includes a halftone processing unit configured to apply halftone processing based on a dither matrix to image data, a correction unit configured, with respect to the processed image data, to shift a pixel of the image data in a sub-scanning direction at a correction position in a main scanning direction which is determined based on correction information for correcting a distortion due to a curve of a scanning line for forming an image according to the image data, and a resolution conversion unit configured to apply resolution conversion processing for lowering a resolution of image data to the corrected image data, wherein the dither matrix results in that the image data to which the resolution conversion processing has been applied includes matched portions of halftone dot patterns appearing in regions preceding and following the correction position in the main scanning direction.

27 Claims, 21 Drawing Sheets

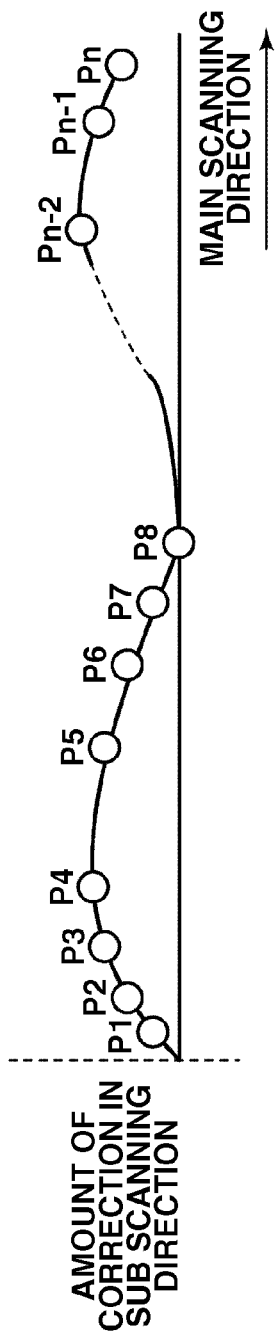

| 242 | 217 | 38 | 13 | 76 | 115 | 89 | 64 | 102 | 204 |
|---|---|---|---|---|---|---|---|---|---|
| 229 | 178 | 127 | 140 | 191 | 153 | 25 | 0 | 51 | 166 |
| 89 | 64 | 102 | 204 | 242 | 217 | 38 | 13 | 76 | 115 |
| 25 | 0 | 51 | 166 | 229 | 178 | 127 | 140 | 191 | 153 |
| 38 | 13 | 76 | 115 | 89 | 64 | 102 | 204 | 242 | 217 |
| 127 | 140 | 191 | 153 | 25 | 0 | 51 | 166 | 229 | 178 |
| 102 | 204 | 242 | 217 | 38 | 13 | 76 | 115 | 89 | 64 |
| 51 | 166 | 229 | 178 | 127 | 140 | 191 | 153 | 25 | 0 |
| 76 | 115 | 89 | 64 | 102 | 204 | 242 | 217 | 38 | 13 |
| 191 | 153 | 25 | 0 | 51 | 166 | 229 | 178 | 127 | 140 |

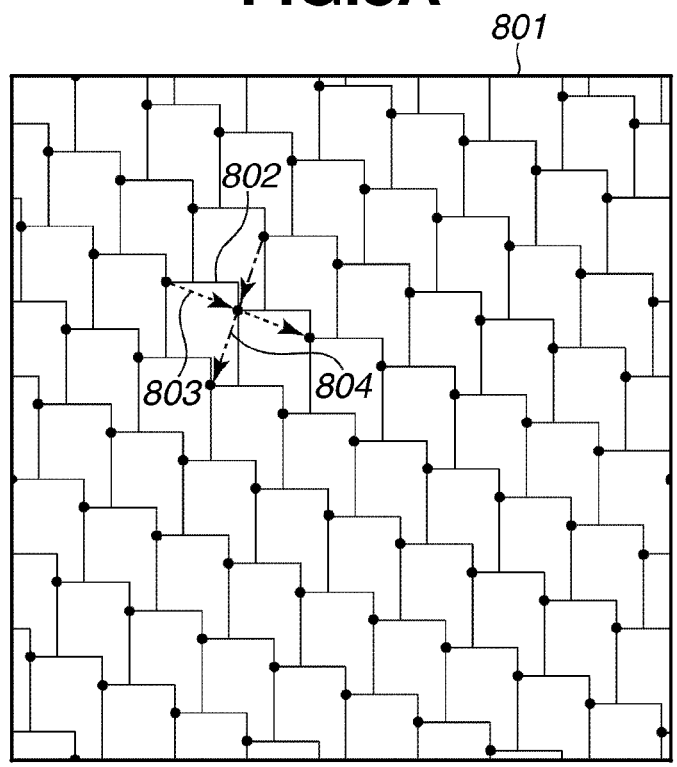

FIG.14A
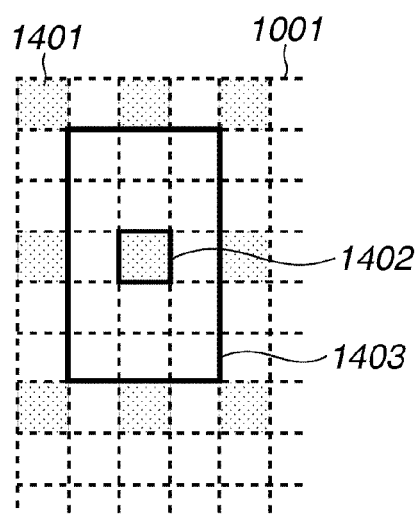
FIG.14B
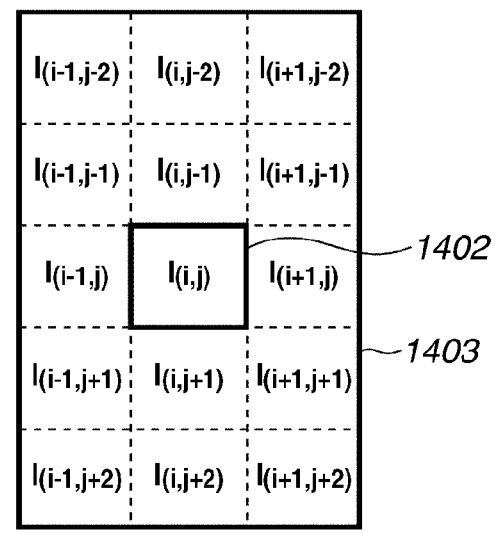
FIG.14C
| a(-1,-2) | a(0,-2) | a(1,-2) | ~1404 |
|---|---|---|---|
| a(-1,-1) | a(0,-1) | a(1,-1) | |
| a(-1,0) | a(0,0) | a(1,0) | |
| a(-1,1) | a(0,1) | a(1,1) | |
| a(-1,2) | a(0,2) | a(1,2) | |
FIG.14D
| 1 | 1 | 1 | ~1405 |
|---|---|---|---|
| 2 | 3 | 2 | |
| 3 | 6 | 3 | |
| 2 | 3 | 2 | |
| 1 | 1 | 1 | |

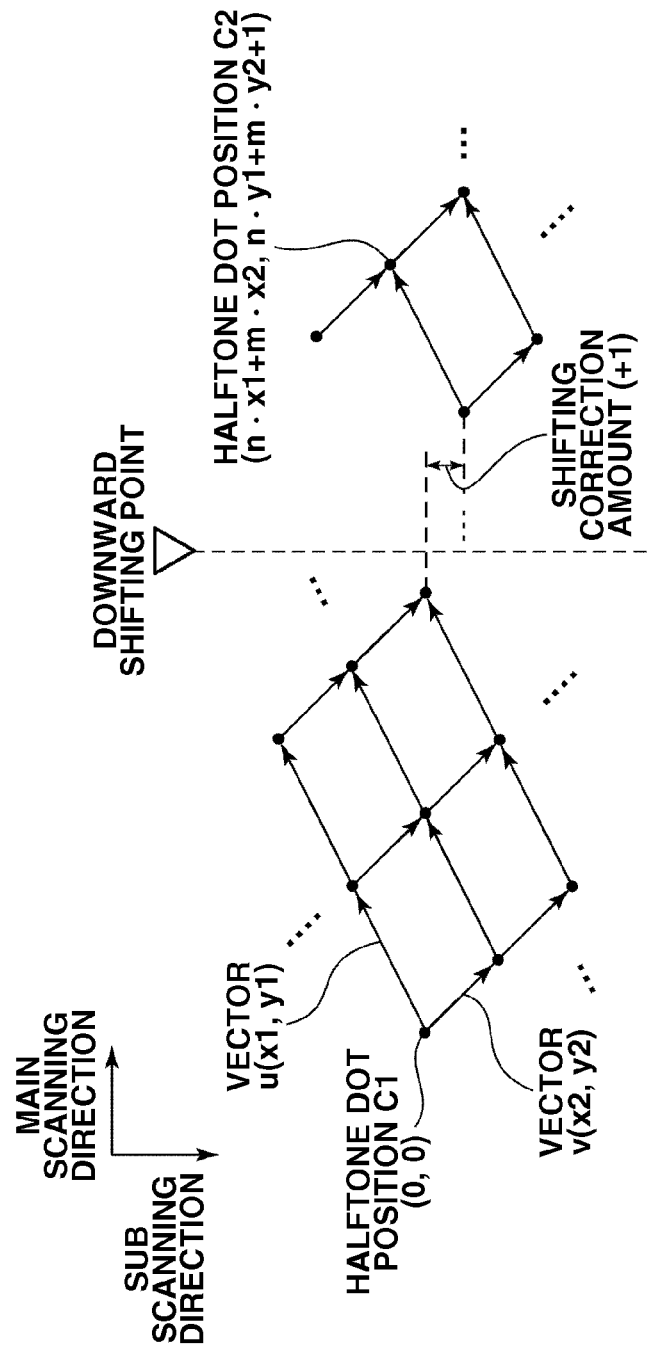

IMAGE PROCESSING APPARATUS, IMAGE PROCESSING METHOD, AND STORAGE MEDIUM

BACKGROUND OF THE INVENTION

1. Field of the Invention

The present disclosure relates to an image processing apparatus, an image processing method, and a storage medium.

2. Description of the Related Art

The electrophotographic process is known as an image recording method used for color image forming apparatuses, such as color printers and color copying machines. With the electrophotographic process, a photosensitive drum is exposed to light of a laser beam or light-emitting element, such as a light-emitting diode (LED) to form a latent image. The latent image is developed by toner, i.e., a charged color material to form a toner image. The toner image is transferred to a recording medium, such as paper, and then fixed. A tandem-type color image forming apparatus is an example of an electrophotographic image forming apparatus in which the same number of developing units and photosensitive drums as the number of toner colors sequentially transfer images of different color planes onto an image conveyance belt and a recording medium.

As a technique for reducing misregistration on each color plane arising in a tandem-type color image forming apparatus, Japanese Patent Application Laid-Open No. 2004-170755 discusses a technique for measuring the magnitude of the inclination and a curve of the laser beam scanning line using an optical sensor, correcting image data to cancel the inclination and a curve, and printing the data. This technique includes processing (shifting processing) for shifting pixel data of image data in the sub-scanning direction on a pixel basis. Processing image data through electrical correction in this way eliminates the need of mechanical adjustment members and adjustment procedures in the assembly process. Accordingly, the color image forming apparatus can be downsized, and cope with misregistration at low costs.

Japanese Patent Application Laid-Open No. 4-336859 discusses a technique for reducing an increase in cost of a large capacity storage memory in accordance with the increasing accuracy, resolution, and image processing speed of image forming apparatuses.

The technique discussed in Japanese Patent Application Laid-Open No. 4-336859, using an image forming apparatus having a low print resolution, projects low-resolution image data to expose a photosensitive member to light of the relevant data so that beam dots overlap on exposed portions for pixels. Accordingly, a latent image can be formed such a manner that overlapping exposed portions between pixels serve as effective pixels that can be developed. This technique is referred to as spot-multiplexing for performing image printing with a pseudo higher resolution than that of the image data.

The shifting processing produces a pixel level difference by one pixel to shift the pixel data in the sub-scanning direction on a pixel basis. Therefore, applying the shifting processing to high-resolution image data provides a smaller pixel level difference, which therefore is less noticeable when developed, than applying the shifting processing to low-resolution image data. Accordingly, a sequence is assumed, in which the shifting processing is applied to high-resolution image data and then conversion processing (pseudo high-resolution conversion processing) is applied to the image data (resulting from the shifting processing) to convert it into low-resolution image data for the purpose of spot-multiplexing. In this case, however, in the image data resulting from the resolution conversion processing, the type and profile of appearing halftone dots may change at a certain pixel position in the main scanning direction at which a pixel level difference is caused by the shifting processing. Accordingly, color unevenness may arise in an image printed on a recording medium.

SUMMARY OF THE INVENTION

An image processing apparatus includes a halftone processing unit configured to apply halftone processing based on a dither matrix to image data, a correction unit configured, with respect to the image data to which the halftone processing has been applied, to shift a pixel of the image data in a sub-scanning direction at a correction position in a main scanning direction which is determined based on correction information for correcting a distortion due to a curve of a scanning line for forming an image according to the image data, and a resolution conversion unit configured to apply resolution conversion processing for lowering a resolution of image data to the corrected image data, wherein the dither matrix results in that the image data to which the resolution conversion processing has been applied includes matched portions of halftone dot patterns appearing in regions preceding and following the correction position in the main scanning direction.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 5A to 5C illustrate a method for storing profile characteristic data.

FIGS. 8A and 8B illustrate an example of a binary dither matrix.

FIG. 11 illustrates an example of a binary dither matrix.

FIGS. 12A and 12B illustrate examples of image data.

FIGS. 13A and 13B illustrate examples of image data.

FIGS. 14A to 14D illustrate a relation between pseudo high-resolution conversion processing and image data.

FIG. 16 illustrates an example of a dither matrix.

FIGS. 17A and 17B illustrate examples of image data.

FIG. 18 illustrates an arrangement of halftone dot cells.

DESCRIPTION OF THE EMBODIMENTS

Various exemplary embodiments, features, and aspects of the invention will be described in detail below with reference to the drawings.

Figure 1:
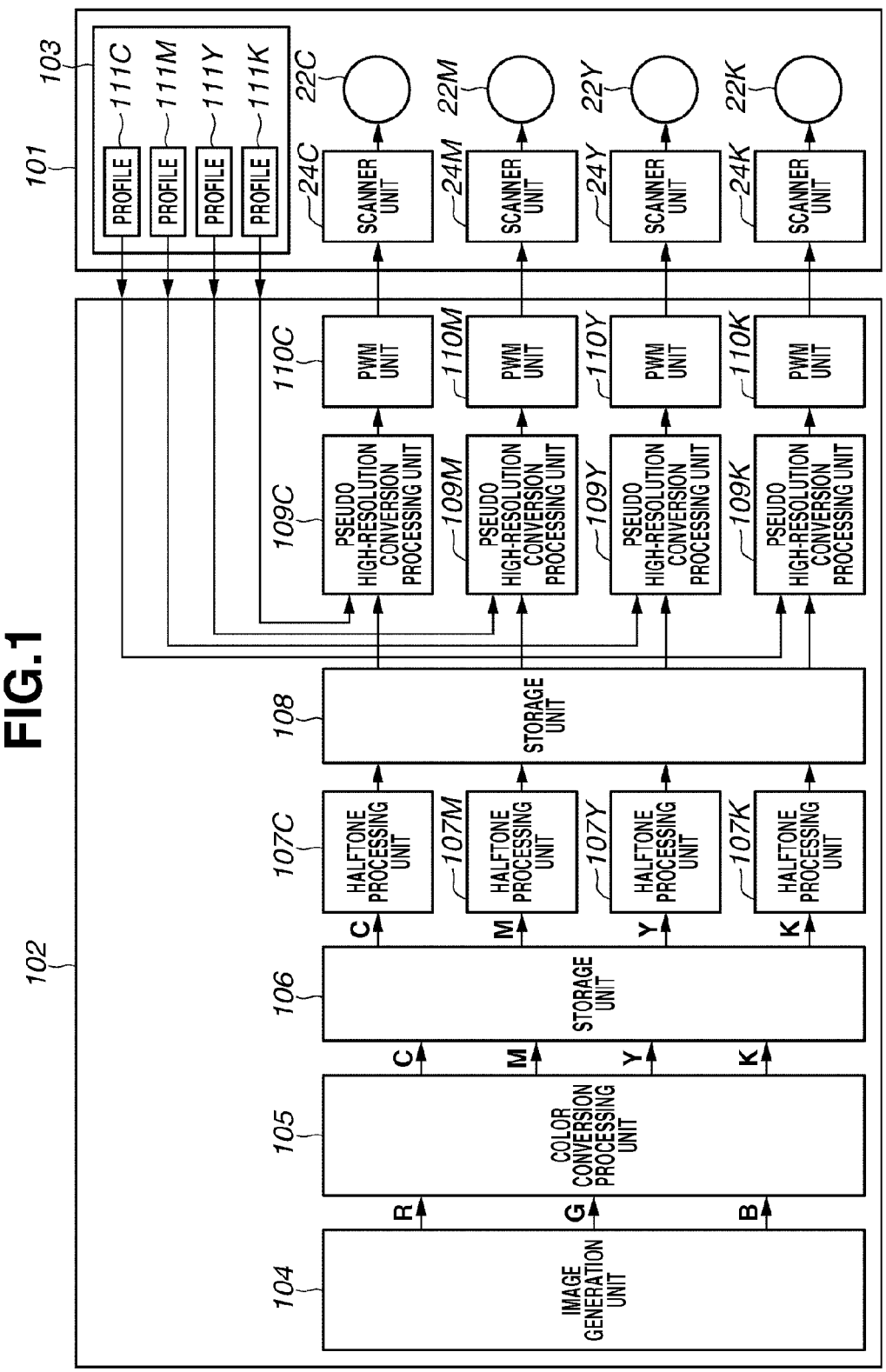
FIG. 1 is a block diagram illustrating a configuration of an image forming apparatus.

FIG. 1 illustrates a configuration of function blocks related to electrostatic latent image formation by an electrophotographic color image forming apparatus (also referred to as an image processing apparatus) according to a first exemplary embodiment. The color image forming apparatus includes an image forming unit 101 and an image processing unit 102. The image processing unit 102 generates rasterized bitmap image data. Based on the generated bitmap image data, the image forming unit 101 forms an image on a recording sheet medium 11 such as paper.

Figure 2:
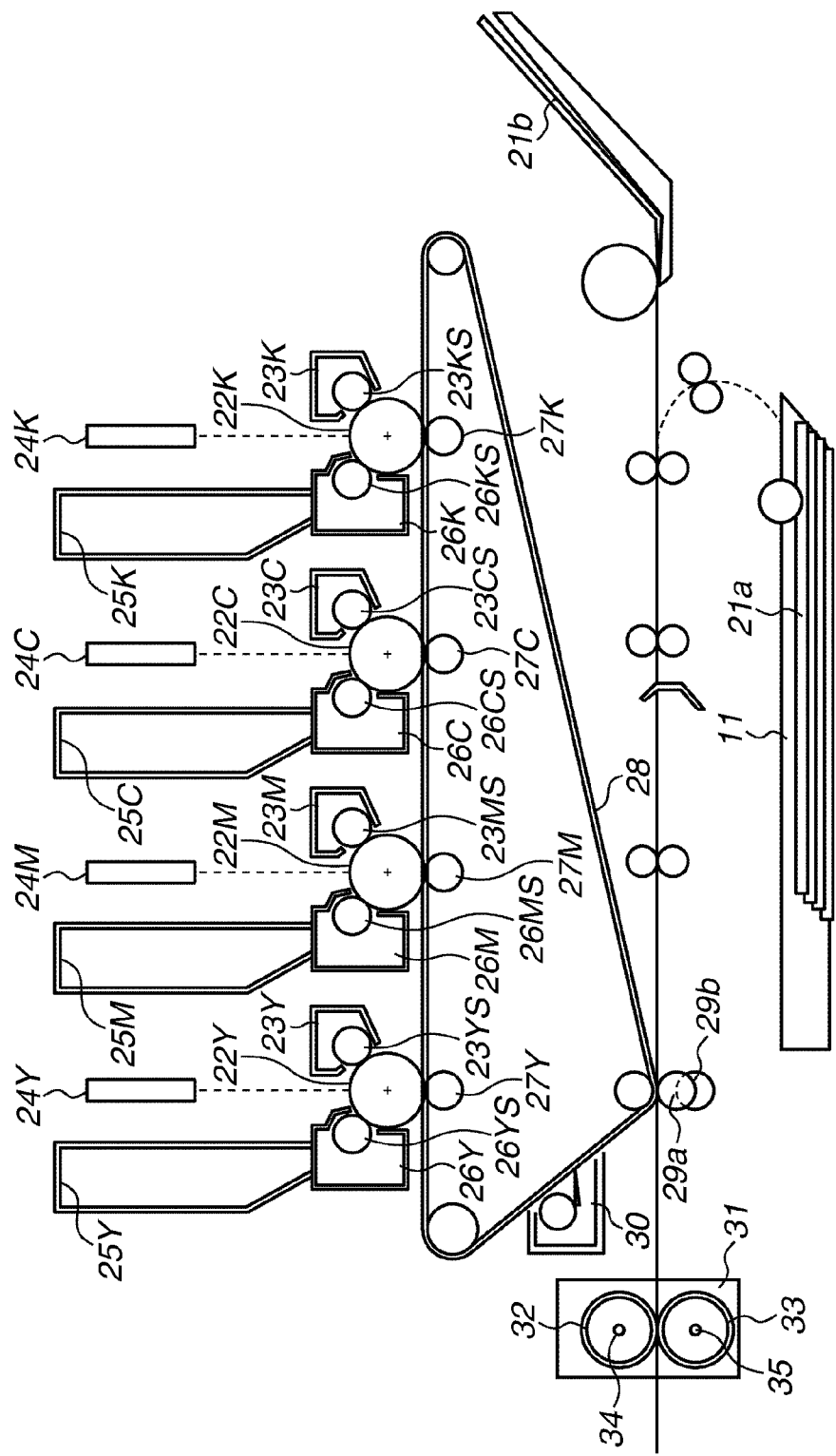
FIG. 2 is a sectional drawing illustrating the image forming apparatus.

FIG. 2 is a sectional view illustrating a tandem-type electrophotographic color image forming apparatus employing an intermediate transfer member 28. The following describes an operation performed by the image forming unit 101 in the electrophotographic color image forming apparatus with reference to FIG. 1.

The image forming unit 101 emits exposure light according to the image data generated by the image processing unit 102, forms electrostatic latent images, and develops the electrostatic latent images to form respective monochrome toner images. The image forming unit 101 superimposes the monochrome toner images to form a multicolor toner image, transfers the multicolor toner image onto the recording medium 11 illustrated in FIG. 2, and fixes the multicolor toner image on the recording medium 11.

[Hardware Configuration of Image Forming Apparatus]

Referring to FIG. 2, the image forming apparatus includes four charging units 23C, 23M, 23Y, and 23K (hereinbelow referred to as charging unit(s) 23) for charging respective photosensitive members 22C, 22M, 22Y, and 22K (hereinbelow referred to as photosensitive member(s) 22) for four process colors, i.e., cyan (C), magenta (M), yellow (Y), and black (K). The charging units 23 respectively include sleeves 23CS, 23MS, 23YS, and 23KS (hereinbelow referred to as sleeve(s) 23S).

Driving forces of drive motors (not illustrated) are transmitted to the photosensitive members 22 to rotate them in the counterclockwise direction in response to an image formation operation. In an exposure unit, scanner units 24C, 24M, 24Y, and 24K (hereinbelow referred to as scanner unit(s) 24) irradiate the photosensitive members 22 with laser exposure light to selectively scan surfaces of the photosensitive members 22 based on the image data, thus forming electrostatic latent images on the photosensitive members 22. A latent image formed by the image forming unit 101 according to the present exemplary embodiment has a resolution of 600 dots per inch (dpi) in the laser scanning direction (hereinbelow referred to as main scanning direction) and a resolution of 600 dpi in the sub-scanning direction perpendicularly intersecting with the main scanning direction.

To visualize the electrostatic latent images, developing units 26C, 26M, 26Y, and 26K (hereinbelow referred to as developing unit(s) 26) illustrated in FIG. 2 are provided for process colors C, M, Y, and K, respectively. The developing units 26 are respectively provided with sleeves 26CS, 26MS, 26YS, and 26KS (hereinbelow referred to as sleeve(s) 26S). The developing units 26 are detachably attached.

The intermediate transfer member 28 illustrated in FIG. 2 rotates in the clockwise direction to receive monochrome toner images from the photosensitive members 22. The monochrome toner images are transferred onto the intermediate transfer member 28 by the rotations of the photosensitive members 22 and primary transfer rollers 27C, 27M, 27Y, and 27K (hereinbelow referred to as primary transfer roller(s) 27) respectively located at positions facing to the photosensitive members 22. Applying a suitable bias voltage to the primary transfer rollers 27 and differentiating the rotational speeds of the photosensitive members 22 from the rotational speed of the intermediate transfer member 28 enable efficiently transferring the monochrome toner images onto the intermediate transfer member 28. This process is referred to as a primary transfer process.

In the primary transfer process, the monochrome toner images having respective process colors are superimposed to one another on the intermediate transfer member 28 to form a multicolor toner image thereon. The formed multicolor toner image is conveyed to a secondary transfer roller pair 29 by the rotation of the intermediate transfer member 28. Simultaneously, the recording medium 11 is sandwiched and conveyed from a paper feed tray 21 to the secondary transfer roller pair 29, and the multicolor toner image formed on the intermediate transfer member 28 is transferred onto the recording medium 11. At this time, the multicolor toner image is electrostatically transferred by a suitable bias voltage applied to the secondary transfer roller pair 29. This process is referred to as a secondary transfer process. While the multicolor toner image is being transferred onto the recording medium 11, the secondary transfer roller pair 29 contacts with the recording medium 11 at a position 29a. After printing, the secondary transfer roller pair 29 separates to a position 29b.

The fixing unit 31 includes a fixing roller 32 for heating the recording medium 11 to melt and fix the transferred multicolor toner image onto the recording medium 11, and a pressure roller 33 for pressurizing the recording medium 11 onto the fixing roller 32. The fixing roller 32 and the pressure roller 33 are hollow members including heaters 34 and 35, respectively. The fixing unit 31 conveys the recording medium 11 holding the multicolor toner image via the fixing roller 32 and the pressure roller 33, and applies heat and pressure to the recording medium 11 to fix the toner thereon.

After fixing the toner, a discharge roller pair (not illustrated) discharges the recording medium 11 onto a sheet discharge tray (not illustrated), and the image formation operation ends. A cleaning unit 30 cleans the toner remaining on the intermediate transfer member 28. A cleaner container stores waste toner remaining on the intermediate transfer member 28 after the multicolor (4-color) toner image from the intermediate transfer member 28 has been transferred onto the recording medium 11.

[Shifting Processing]

Figure 3A:
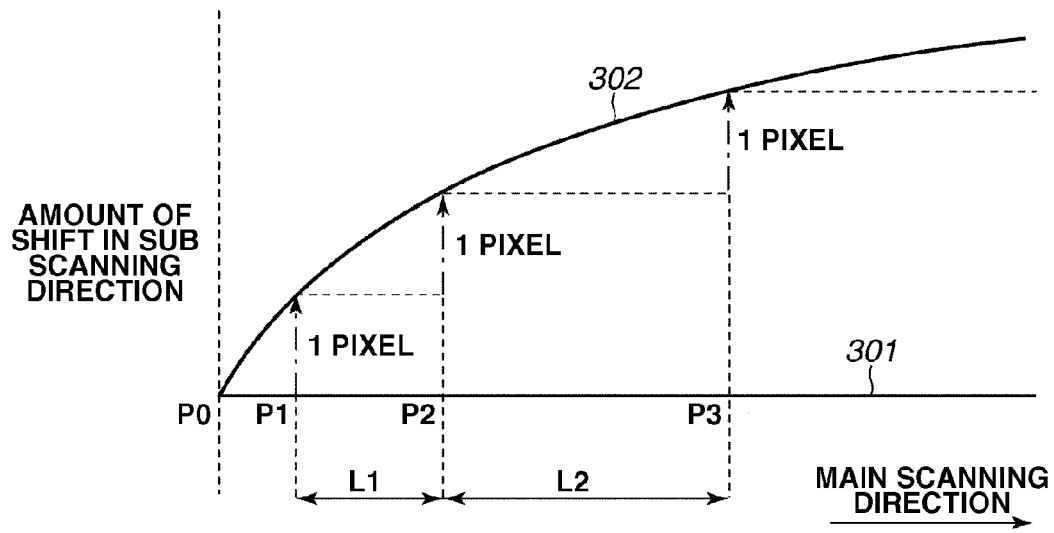
FIGS. 3A and 3B illustrate examples of profile characteristics of the image forming apparatus.
Figure 3B:
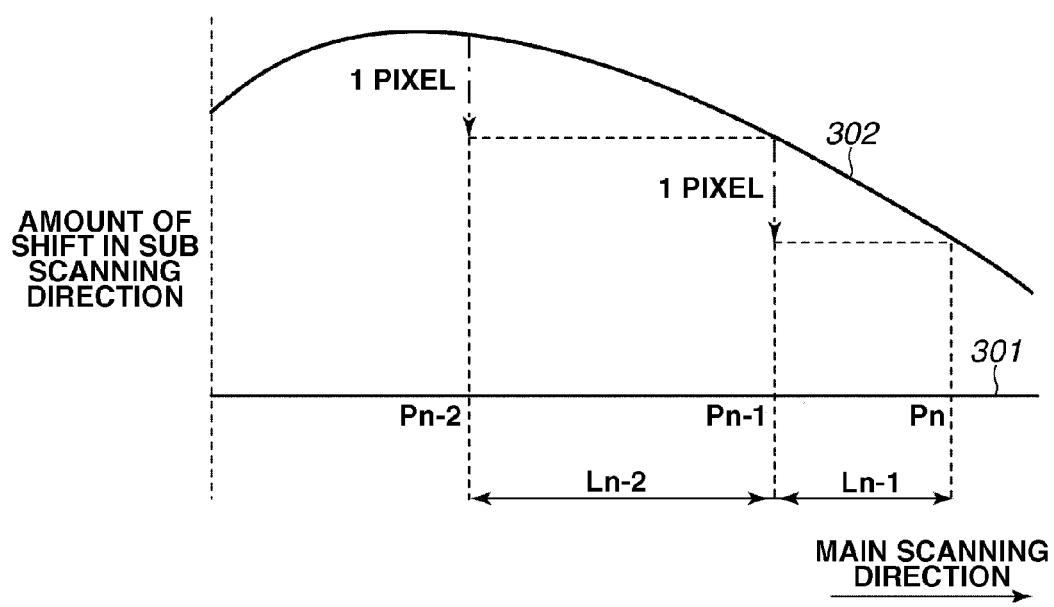

The following describes the profile characteristics of the image forming apparatus, with reference to FIGS. 3A, 3B, 4A, 4B, and 5A to 5C. The profile characteristics indicate magnitudes of an inclination and a curve of a laser beam scanning line for each color. FIG. 3A illustrates a region in which the laser beam scanning line shifts upward as it advances in the main scanning direction, as the curve characteristics of the laser beam scanning line of the image forming apparatus. FIG. 3B illustrates a region in which the laser beam scanning line shifts downward as it advances in the main scanning direction, as the curve characteristics of the laser beam scanning line of the image forming apparatus. A straight line 301 indicates an ideal scanning line which does not shift as the laser beam scanning line advances in the main scanning direction when scanning is performed perpendicularly to the rotational direction of a photosensitive member 22.

In the following descriptions, the profile characteristics provide an inverted profile of the curve characteristics. This means that the profile characteristics premise the direction in which the image processing unit 102 should correct the scanning line. However, the definition of the profile characteristics is not limited thereto. It is also possible that the profile characteristics are defined as the curving direction (curve characteristics) of the laser beam scanning line of the image forming unit 101, and the image processing unit 102 corrects the curve based on the inverted profile.

Figure 4A:
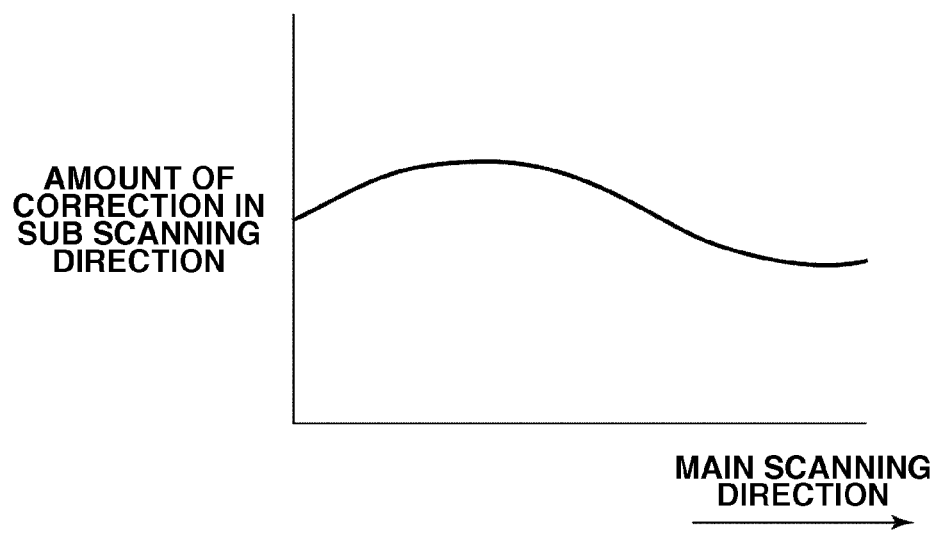
FIGS. 4A and 4B illustrate a relation between a scanning line shift on the image forming apparatus and a direction in which the scanning line to be corrected.
Figure 4B:
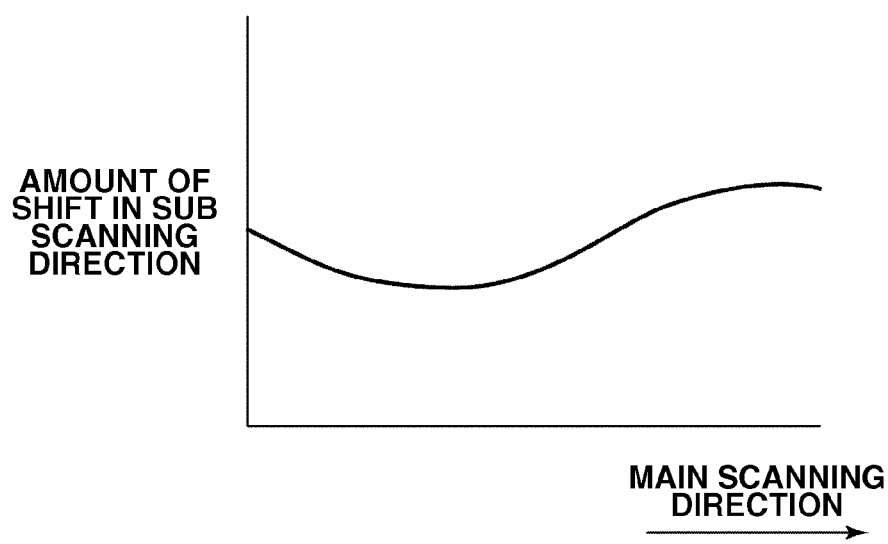

FIG. 4A illustrates the direction in which the scanning line should be corrected by the image processing unit 102 based on the profile definition, and FIG. 4B illustrates the direction in which the laser beam scanning line of the image forming unit 101 shifts. FIGS. 4A and 4B correlate with each other. When the profile characteristics, i.e., the direction in which the scanning line should be corrected by the image processing unit 102, are presented as illustrated in FIG. 4A, the curve characteristics of the image forming unit 101 provide an inverted profile as illustrated in FIG. 4B.

Profile characteristic data stored in a storage unit includes the pixel position of each shifting point (described below) in the main scanning direction, and the direction in which the scanning line should be shifted to the next shifting point, as illustrated in FIGS. 5A to 5C. A pixel position of a shifting point in the main scanning direction is sometimes referred to as a shifting position or a correction position. More specifically, referring to FIG. 5A, shifting points P1, P2, P3, and . . . Pn are defined for the profile characteristics. A shifting point is defined as a position in the main scanning direction at which the scanning line to be read out is shifted by one pixel in the sub-scanning direction. The shifting point is shifted either in the upward direction or in the downward direction to the next shifting point. The processing for shifting the image data line by one pixel is referred to as shifting processing or a line shift. The shifting processing enables correcting the curve of the laser beam scanning line for forming an image based on image data.

For example, at the shifting point P2, a line shift (shifting processing) by one pixel in the upward direction should be performed up to the next shifting point P3. Therefore, the shifting direction at the shifting point P2 is the upward direction (↑), as illustrated in FIG. 5B. Similarly, at the shifting point P3, the shifting direction is the upward direction (↑) up to the next shifting point P4. Unlike the shifting direction at the shifting points P1 to P3, the shifting direction at the shifting point P4 is the downward direction (↓). For example, when the upward direction is indicated by data "1" and the downward direction is indicated by data "0", the profile data to be stored is as illustrated in FIG. 5C. In this case, the number of stored data items equals the number of shifting points. For example, when there are n shifting points, n bits are stored.

A curve 302 indicates an actual inclined and curved laser beam scanning line resulting from the positional accuracy and diameter shift of the photosensitive members 22, and the positional accuracy of optical systems of the scanner units 24 (24C, 24M, 24Y, and 24K) for respective colors illustrated in FIG. 2. In image forming apparatuses, the curve characteristics differ for each recording device (recording engine), and in color image forming apparatuses, the curve characteristics further differ for each color plane. Therefore, the profile characteristics also differ for each recording device and, in color image forming apparatuses, the profile characteristics further differ for each color plane.

The following describes shifting points in a region in which the laser beam scanning line shifts upward in the main scanning direction, with reference to FIG. 3A. Referring to FIG. 3A, at the shifting points P1, P2, and P3, the laser beam scanning line shifts by one pixel in the sub-scanning direction on the curve 302 indicating the upward curve characteristics. FIG. 3A is illustrated with reference to a point P0. As illustrated in FIG. 3A, distances L1 and L2 between shifting points decrease in a region in which the curve 302 indicating the curve characteristics steeply changes, and increase in a region in which the curve 302 gently changes.

The following describes shifting points in a region in which the laser beam scanning line shifts downward as it advances in the main scanning direction, with reference to FIG. 3B. Also in the region in which the laser beam scanning line shifts downward, a shifting point refers to a point at which the scanning line shifts by one pixel. Referring to FIG. 3B, at each of shifting points Pn and Pn+1, the laser beam scanning line shifts by one pixel in the sub-scanning direction on the curve 302 indicating the downward curve characteristics. As illustrated in FIG. 3B, similar to FIG. 3A, distances Ln and Ln+1 between shifting points decrease in a region in which the curve 302 indicating the curve characteristics steeply changes, and increase in a region in which the curve 302 gently changes.

Thus, shifting points are closely related to the degree of change of the curve 302 indicating the curve characteristics of the laser beam scanning line of the image forming apparatus. Therefore, an image forming apparatus having steeper curve characteristics provides a larger number of shifting points. Conversely, an image forming apparatus having gentler curve characteristics provides a smaller number of shifting points.

[Processing of Image Processing Unit]

The following describes processing performed by the image processing unit 102 in the color image forming apparatus according to the present exemplary embodiment, with reference to FIG. 1.

An image generation unit 104 rasterizes print data, such as Page Description Language (PDL) data, received from an information processing apparatus (not illustrated), such as a host computer, into image data in the red, green, and blue (RGB) color space suitable for print processing, and outputs the rasterized image data for each pixel. According to the present exemplary embodiment, the image generation unit 104 has two different image data generation modes. In one mode, the image generation unit 104 generates image data having a 600-dpi resolution in the main scanning direction and the sub-scanning direction. In the other mode, the image generation unit 104 generates image data having a 1200-dpi resolution in the main scanning direction and the sub-scanning direction. These modes are selected by an instruction on resolution included in the print data received from the information processing apparatus.

The color image forming apparatus of the present exemplary embodiment may include an instruction unit, such as a user interface (UI) for determining based on a user instruction the resolution of the image data to be rasterized by the image generation unit 104. The resolution may be determined by the instruction unit.

The image generation unit 104 may handle image data obtained by optically reading a document instead of image data received from and generated by the information processing apparatus. In this case, the color image forming apparatus includes a reading unit (not illustrated), such as a scanner. The reading unit includes at least a charge-coupled device (CCD) or contact image sensor (CIS). The reading unit may further include a processing unit for applying predetermined image processing to read image data. Further, instead of being included in the color image forming apparatus, the reading unit may be configured as a different unit therefrom, and the color image forming apparatus may receive image data from the independent reading unit via an interface (not illustrated).

A color conversion processing unit 105 converts the image data in the RGB color space into image data in the cyan, magenta, yellow, and black (CMYK) color space according to the process colors of the image forming unit 101, and stores the image data in the CMYK color space in a storage unit 106. The storage unit 106 is a first storage unit included in the image processing unit 102, for once storing image data subjected to print processing. The storage unit 106 may be configured as a page memory for storing data for one page, or as a band memory for storing data for a plurality of lines.

Halftone processing units 107C, 107M, 107Y, and 107K (hereinbelow referred to as halftone processing unit(s) 107) apply screen processing to image data for each color plane output from the storage unit 106 to generate N-valued image data in which halftone dots are generated. The screen processing will be described in detail below with reference to FIGS. 7A, 7B, 8A, 8B, and 9. The screen processing is sometimes simply referred to as halftone processing.

A storage unit 108 is a second storage unit included in the image forming apparatus, and stores N-valued image data generated by the halftone processing units 107. Image data stored in the storage unit 108 is read based on profiles 111C, 111M, 111Y, and 111K (hereinbelow referred to as profile(s) 111) which are pieces of information about the profile characteristics. More specifically, in the case where the pixel position in the main scanning direction of a pixel subjected to the image processing stored in the storage unit 108 is a shifting point, a line shift (shifting processing) of image data by one pixel in the sub-scanning direction is performed when the image data is read from the storage unit 108.

Figure 6A:
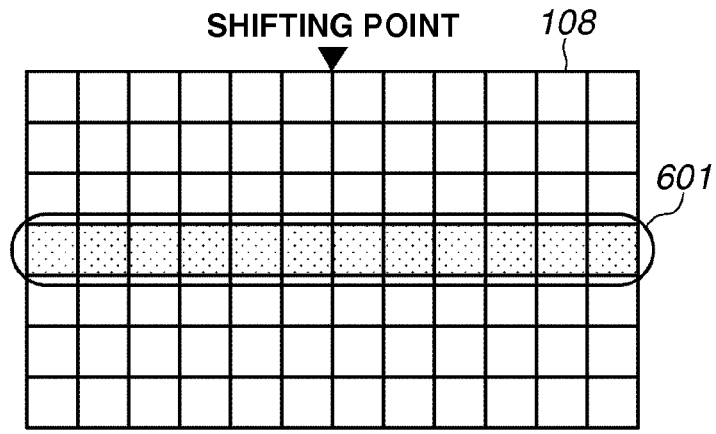
FIGS. 6A to 6C schematically illustrate data statuses stored in a storage unit.
Figure 6B:
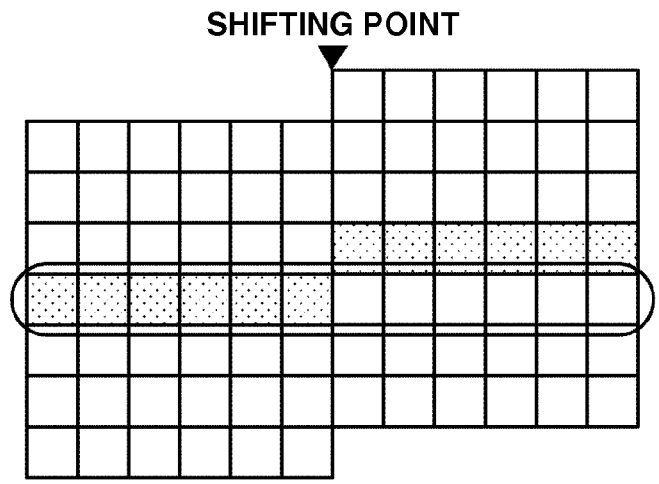
Figure 6C:
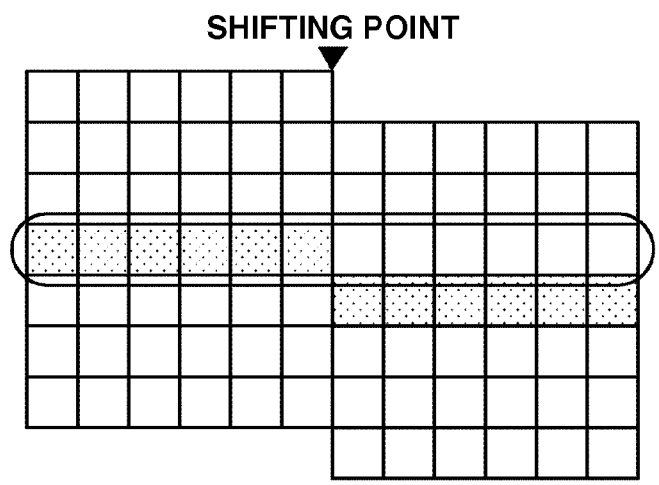

FIG. 6A schematically illustrates a state of image data stored in the storage unit 108. As illustrated in FIG. 6A, when the image data is stored in the storage unit 108, the image data has not undergone the line shift (shifting processing) but has undergone the processing by the halftone processing unit 107. In the case of the upward profile characteristics, i.e., the scanning line is upwardly corrected by the image processing unit 102 when image data of a line 601 illustrated in FIG. 6A is read from the storage unit 108, the position of the pixel data is upwardly shifted by one pixel in the sub-scanning direction at the shifting point, as illustrated in FIG. 6B. In the case of the downward profile characteristics, i.e., the scanning line is downwardly corrected by the image processing unit 102 when the image data of the line 601 is read from the storage unit 108, the position of pixel data is downwardly shifted by one pixel in the sub-scanning direction at the shifting point, as illustrated in FIG. 6C.

Pseudo high-resolution conversion processing units 109C, 109M, 109Y, and 109K (hereinbelow referred to as pseudo high-resolution conversion processing unit(s) 109) read image data from the storage unit 108 while shifting the scanning line in the sub-scanning direction based on the profiles 111. In this case, the pseudo high-resolution conversion processing unit 109 functions as a correction processing unit for performing shifting processing. The pseudo high-resolution conversion processing unit 109 applies the pseudo high-resolution conversion processing, described below, to the image data read based on the profile 111 to convert it into image data having a 600-dpi resolution both in the main scanning direction and the sub-scanning direction.

Pulse width modulation (PWM) units 110C, 110M, 110Y, and 110K (hereinbelow referred to as PWM unit(s) 110) convert the image data pieces for respective color planes output from the pseudo high-resolution conversion processing units 109 into the exposure time of the laser beams of the scanner units 24. As described above, the scanner unit 24 emits exposure light onto the photosensitive member 22 according to the exposure time converted based on the image data to form an image (electrostatic latent image) thereon.

The profile 111 which has already been described with reference to FIG. 5 are stored in the image forming unit 101. As described above, the profile 111 is information indicating the profile characteristics. In other words, the profile 111 is correction information for correcting a curve of a scanning line of the image forming apparatus.

Although, according to the present exemplary embodiment, the first storage unit 106 and the second storage unit 108 are configured as different units, these units may be configured as a common storage unit in the image forming apparatus.

[Halftone Processing]

The following describes detailed operations performed by the halftone processing unit 107 of the image processing unit 102, with reference to FIGS. 7A, 7B, 8A, 8B, and 9.

Figures 7A, 7B:
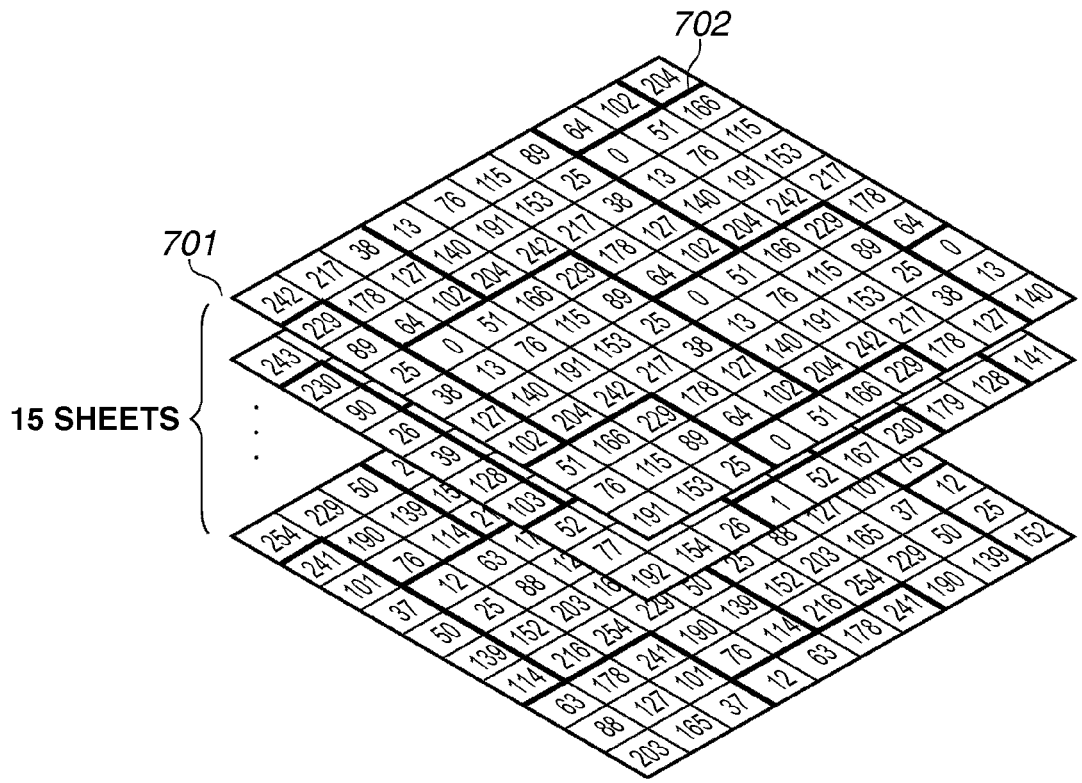
FIGS. 7A and 7B illustrate an example of a multivalued dither matrix.

FIGS. 7A and 7B illustrate an example of a 600-dpi dither matrix according to the present exemplary embodiment. FIG. 8A illustrates an example of a 1200-dpi dither matrix according to the present exemplary embodiment.

The halftone processing unit 107 receives image data of corresponding colors from CMYK image data, and performs the pseudo-halftone processing based on the screen processing. The screen processing is based on the dither matrix method which reads a threshold value from a dither matrix containing a plurality of arranged threshold values and compares the input image data with the threshold value to obtain N-valued image data. The screen processing converts input continuous tone image data into area gradation image data containing halftone dots. FIG. 7A illustrates a dither matrix 701, i.e., a 600-dpi multivalued dither matrix which contains a plurality of matrices 702. A matrix 702 contains a halftone dot cell 703 repetitively arranged. The halftone dot cell 703 contains a plurality of threshold values. Only a part of the halftone dot cell 703 is arranged at an end of a matrix. However, when the dither matrix 701 is repetitively applied to the image data in the vertical direction and the horizontal direction, the halftone dot cell 703 is repetitively applied.

The halftone processing unit 107 reads, for each pixel of the image data, a threshold value of the dither matrix at a position corresponding to each pixel position of the dither matrix, and compares the pixel value with the threshold value to convert the pixel of the image data into the number of gradations which can be output by the image forming unit 101. According to the present exemplary embodiment, when the image data has a 600-dpi resolution, the halftone processing unit 107 converts each pixel of the image data into 16-valued image data having 16 gradation values from 0 to 15 (16-valued image data). The dither matrix 701 includes 15 different matrices. According to the present exemplary embodiment, the halftone processing unit 107 reads, for each pixel, a total of 15 threshold values respectively from corresponding positions in the 15 matrices. The halftone processing unit 107 compares each of the 15 read threshold values with the values of the pixel, and outputs the number of times when the pixel value is equal to or larger than the threshold value, thus obtaining 16-valued image data.

Referring to FIG. 8A, a binary dither matrix 801 having a 1200-dpi resolution contains one matrix. Similar to the dither matrix 701, the dither matrix 801 contains a halftone dot cell 802 repetitively arranged. The halftone dot cell 802 contains a plurality of threshold values. According to the present exemplary embodiment, when the image data has a 1200-dpi resolution, the halftone processing unit 107 converts each pixel of the image data into a binary value having two gradation values (0 and 1). For each pixel, the halftone processing unit 107 reads one threshold value from a predetermined position of the matrix. The halftone processing unit 107 compares the read threshold value with the pixel value, and outputs 1 when the pixel value is equal to or larger than the threshold value or outputs 0 otherwise, thus performing binarization.

With the 1200-dpi dither matrix used according to the present exemplary embodiment, components of a vector (hereinbelow referred to as vector information) representing the arrangement of the halftone dot cell 802 are limited, as described below with reference to FIGS. 8A and 8B. Although a dither matrix may have different vector components for each of the C, M, Y, and K color planes, the following describes a dither matrix having one color plane to simplify descriptions. Although, according to the present exemplary embodiment, a dither matrix containing repetitively arranged one type of halftone dot cell is used, other techniques such as a submatrix may be used. A submatrix enables obtaining sufficient number of gradations by using a combination of a plurality of types of halftone dot cells having different threshold values.

[Instruction on Resolution]

Figure 9:
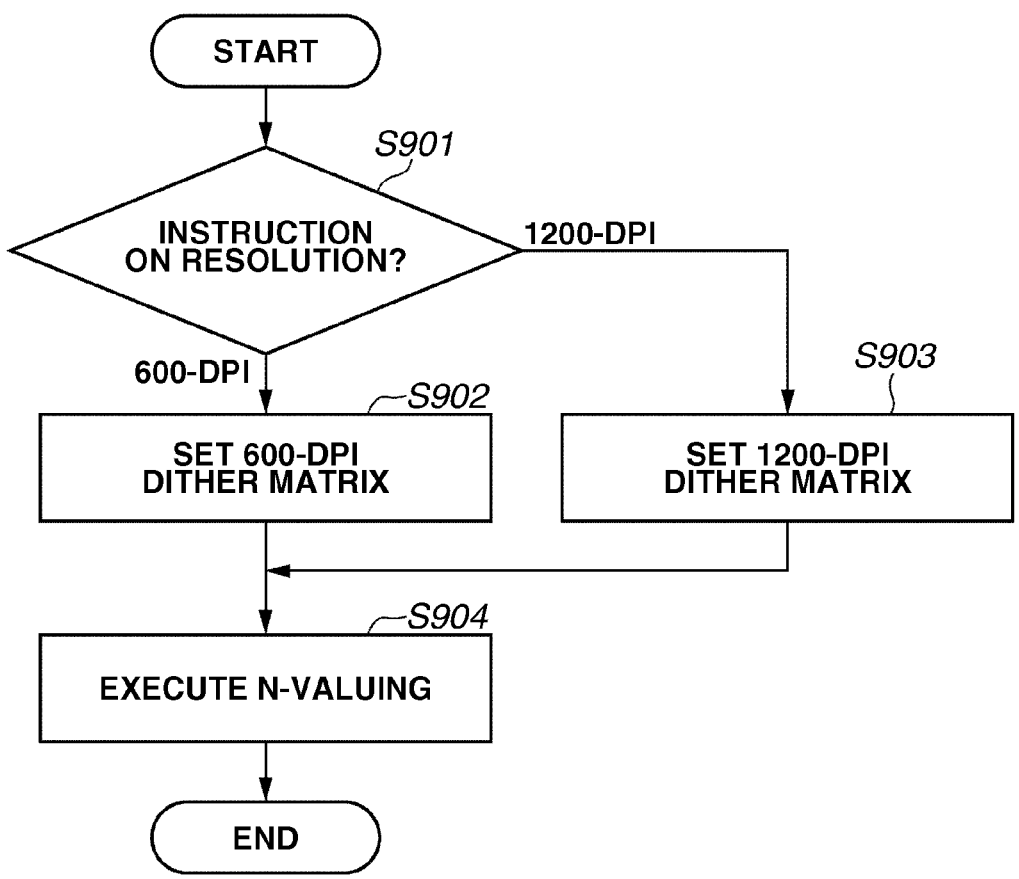
FIG. 9 is a flowchart illustrating an operation of a halftone processing unit.

The following describes operations of the halftone processing unit 107 based on an instruction on resolution included in the print data, with reference to FIG. 9. FIG. 9 is a flowchart illustrating an operation performed by the halftone processing unit 107 according to an instruction on resolution included in the print data of the halftone processing unit 107 according to the present exemplary embodiment.

According to the instruction on resolution included in the print data, the halftone processing unit 107 switches between the 600-dpi multivalued dither matrix 701 and the 1200-dpi binary dither matrix 801 to obtain N-valued image data (N is a natural number equal to or larger than 2).

In step S901, the halftone processing unit 107 determines whether the instruction on resolution included in the print data indicates 600 dpi or 1200 dpi.

When the instruction on resolution indicates 600 dpi, then in step S902, the halftone processing unit 107 sets the 600-dpi multivalued dither matrix 701 to the dither matrix to be used for the screen processing.

When the instruction on resolution indicates 1200 dpi, then in step S903, the halftone processing unit 107 sets the 1200-dpi binary dither matrix 801 to the dither matrix to be used for the screen processing.

In step S904, the halftone processing unit 107 performs the screen processing using the set dither matrix to obtain N-valued image data.

[Pseudo High Resolution Conversion Processing]

The following describes detailed operations performed by the pseudo high-resolution conversion processing unit 109 which is one of features of the present exemplary embodiment, with reference to FIGS. 10A to 10D.

FIGS. 10A to 10D schematically illustrate the pseudo high-resolution conversion processing according to the present exemplary embodiment.

Only when the instruction on resolution included in the print data indicates 1200 dpi, the pseudo high-resolution conversion processing unit 109 applies the pseudo high-resolution conversion processing to image data that has undergone line shift (shifting processing) read from the storage unit 108. As a result, the pseudo high-resolution conversion processing unit 109 converts the image data having a 1200-dpi resolution both in the main scanning direction and the sub-scanning direction into image data having a 600-dpi resolution both in the main scanning direction and the sub-scanning direction. When the instruction on resolution included in the print data indicates 600 dpi, the pseudo high-resolution conversion processing unit 109 outputs 600-dpi image data to the pulse width modulation (PWM) unit 110 without performing the pseudo high-resolution conversion processing.

Figure 10A:
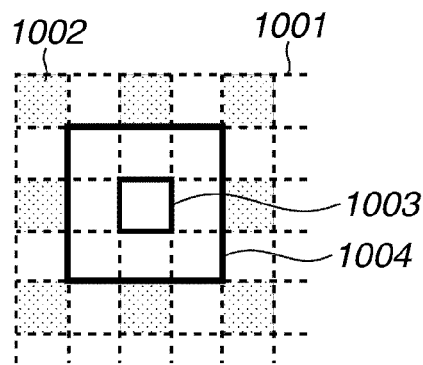
FIGS. 10A to 10D illustrate a relation between pseudo high-resolution conversion processing and image data.

FIG. 10A illustrates a relation between image data and a processing rectangle in the pseudo high-resolution conversion processing. FIG. 10A illustrates a relation between 1200-dpi image data 1001 which is input to the pseudo high-resolution conversion processing unit 109 and a processing rectangle 1004 containing nine pixels centering on a target pixel 1003 (a processing target pixel). In the pseudo high-resolution conversion processing, the pseudo high-resolution conversion processing unit 109 resamples data while moving the processing rectangle 1004 and performs the product-sum operation (refer to FIGS. 10B, 10C, and 10D) within the region of the processing rectangle 1004. The pseudo high-resolution conversion processing according to the present exemplary embodiment converts the resolutions of the input image data in the main scanning direction and the sub-scanning direction from 1200 dpi to 600 dpi. Therefore, the pseudo high-resolution conversion processing unit 109 applies the pseudo high-resolution conversion processing, while sequentially moving the processing rectangle 1004, with respect to the 1200-dpi image data 1001, to move the target pixel 1003 to each of sampling positions 1002 (shaded positions illustrated in FIG. 10A) arranged every two pixel in the main scanning direction and the sub-scanning direction. The sampling position is a pixel position subjected to the sampling processing in the pseudo high-resolution conversion processing. According to the present exemplary embodiment, the sampling position is arranged every other pixel. The interval of arrangement of the sampling positions 1002 is referred to as a sampling interval. The sampling interval is determined by the reduction ratio of the resolutions in the main scanning direction and the sub-scanning direction. According to the present exemplary embodiment, since the resolution both in the main scanning direction and the sub-scanning direction is converted from 1200 dpi to 600 dpi, sampling interval is two (=1200/600) pixels, i.e., sampling is performed at every two pixel.

Figure 10B:
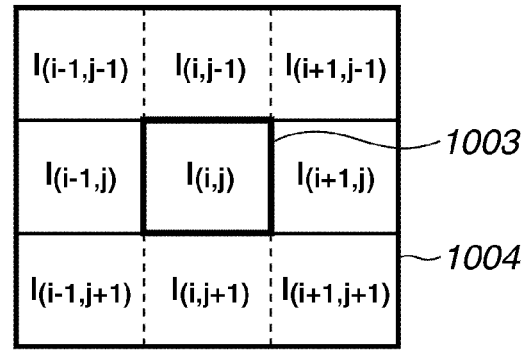
Figure 10C:
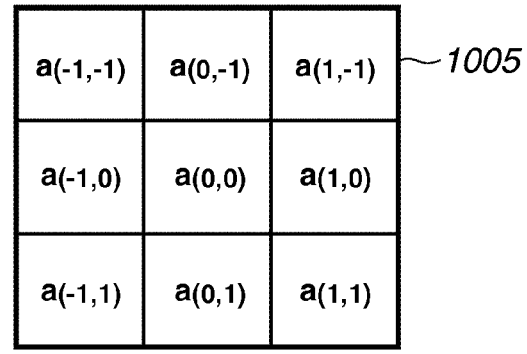
Figure 10D:
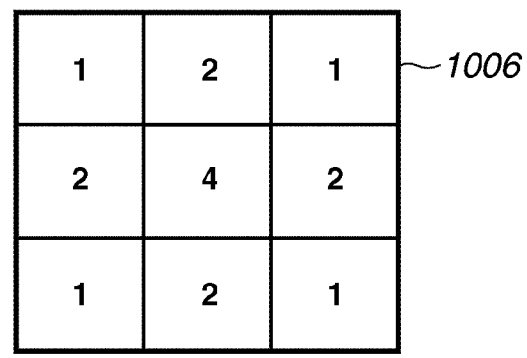

FIG. 10B illustrates an example of the processing rectangle 1004 for the product-sum operation. FIG. 10C illustrates product-sum operation coefficients in the processing rectangle 1004 used for the product-sum operation. FIG. 10D illustrates an example thereof. The processing rectangle 1004 contains nine pixels centering on the target pixel 1003 as described above. A product-sum operation coefficient 1005 includes nine coefficients "a" respectively corresponding to the nine pixels forming the processing rectangle 1004. When the coordinates of the target pixel 1003 are (i, j) and the pixel value is I(i, j), the output OUT is calculated by formula (1) through the product-sum operation.

[Formula 1]

$$\text{OUT} = \frac{15}{\sum_{k=-1}^{1}\sum_{l=-1}^{1} a_{(k,l)}} \sum_{k=-1}^{1}\sum_{l=-1}^{1} I_{(i+k,j+l)} a_{(k,l)} \quad (1)$$

More specifically, since the pixel value I(i, j) is a binary value (0 or 1), the pseudo high-resolution conversion processing unit 109 calculates the product of each pixel in the processing rectangle 1004 and the product-sum operation coefficient 1005 corresponding to the coordinates of the relevant pixel, sums up the products for the nine pixels, and normalizes the output OUT to 15. This processing enables converting the number of gradations of the image data from 2 to 16

(16-valued image data) while converting the resolution of the image data from 1200 dpi to 600 dpi.

FIG. 10D illustrate a product-sum operation coefficient 1006, an example of the product-sum operation coefficient according to the present exemplary embodiment. For example, performing the product-sum operation using the product-sum operation coefficient 1006 enables obtaining an effect of spot-multiplexing, so that printing can be performed with a pseudo higher resolution than the actual resolution. According to the present exemplary embodiment, since an image equivalent to a 1200-dpi resolution can be formed by using 600-dpi image data, even the image forming unit 101 having the capability of a 600-dpi print resolution can print images of characters and lines equivalent to a 1200-dpi resolution.

[Vector Components of Dither Matrix]

The following describes in detail a vector of a 1200-dpi dither matrix which is a feature of an embodiment of the present invention, with reference to FIGS. 8A and 8B. FIG. 8A illustrates a repetitive pattern of a dither matrix. FIG. 8B illustrates a magnified version of the halftone dot cell 802 illustrated in FIG. 8A.

As described above, the dither matrix 801 is formed of the halftone dot cells 802 repetitively arranged. Halftone dots are periodically reproduced according to the arrangement of the halftone dot cell 802. A period of halftone dots is represented by two vectors u and v having vector components equal to the distances between the repetitively arranged halftone dot cells 802 in the main scanning direction and the sub-scanning direction. Both vector components (x, y) described below are integers, where x indicates the main scanning direction component and y indicates the sub-scanning direction component. In the case of the dither matrix 801, a first vector u is a vector 803 illustrated in FIG. 8A, having vector components u (8, 3), and a second vector v is a vector 804 illustrated in FIG. 8A, having vector components v (−3, 8).

Although described in detail below, according to the present exemplary embodiment in which the sampling interval is "2" both in the main scanning direction and the sub-scanning direction, the dither matrix set in step S903 satisfies either one of the following four different vector conditions: (1) Sub-scanning direction components of the two vectors u and v of the dither matrix are an odd number and an even number, respectively, and one of the two vectors, having a sub-scanning direction component of an odd number, has a main scanning direction component of an even number; (2) The sub-scanning direction components of the two vectors u and v of the dither matrix are an odd number and an even number, respectively, and the main scanning direction components of the two vectors u and v are both an odd number; (3) The sub-scanning direction components of the two vectors u and v of the dither matrix are both an odd number, and the main scanning direction components of the two vectors u and v are both an even number; and (4) The sub-scanning direction components of the two vectors u and v of the dither matrix are both an odd number, and the main scanning direction components of the two vectors u and v are an odd number and an even number, respectively.

More specifically, as described below, when the image processing unit 102 applies the halftone processing and the shifting processing to the image data of the 1200-dpi resolution, and then applies the pseudo high-resolution processing accompanied by the resolution conversion processing to 600 dpi, the dither matrix satisfying any one of the vector conditions does not change the type (profile) of halftone dots appearing in the regions to the right and to the left of the shifting point. In other words, when the regions to the right and to the left of the shifting point in the main scanning direction are respectively referred to as a first region (one region) and a second region (the other region), the dither matrix satisfying any one of the vector conditions equalizes the type of halftone dots appearing in the second region to the halftone dot patterns (arrangement) appearing in the first region in the image data resulting from the resolution conversion processing.

In more detail, in the halftone processing, the dither matrix satisfying any one of the vector conditions generates halftone dots such that any one of sampling positions for a plurality of halftone dots in the second region after the shifting processing equals any one of sampling positions for a plurality of halftone dots in the first region after the shifting processing. The first and second regions are also referred to as regions preceding and following the shifting position in the main scanning direction, respectively.

The vectors u and v which are vector components of the dither matrix 801 have an equal length and perpendicularly intersect with each other. In addition, with either vector, the main scanning direction component and the sub-scanning direction component are a combination of an even number and an odd number.

The following describes in detail how the result of the pseudo high-resolution conversion processing by the pseudo high-resolution conversion processing unit 109 changes depending on whether or not the two vector components of the 1200-dpi dither matrix are limited by the vector conditions according to the present exemplary embodiment, with reference to FIGS. 11, 12A, 12B, 13A, and 13B.

Figure 11:
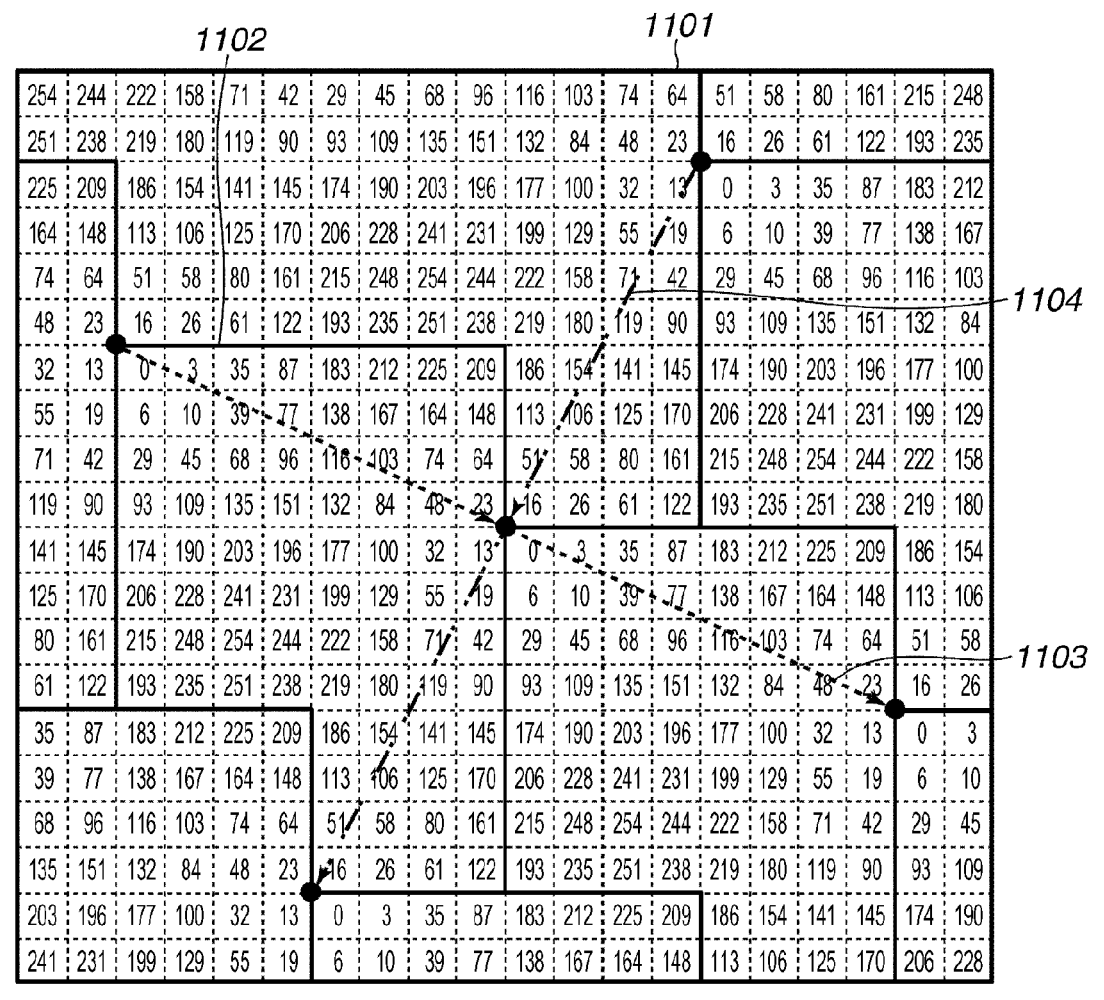

FIG. 11 illustrates an example of a dither matrix 1101 which does not limit the vector components under the vector conditions according to the present exemplary embodiment. More specifically, the vector components of the dither matrix 1101 illustrated in FIG. 11 are a combination of even numbers.

Figure 12A:
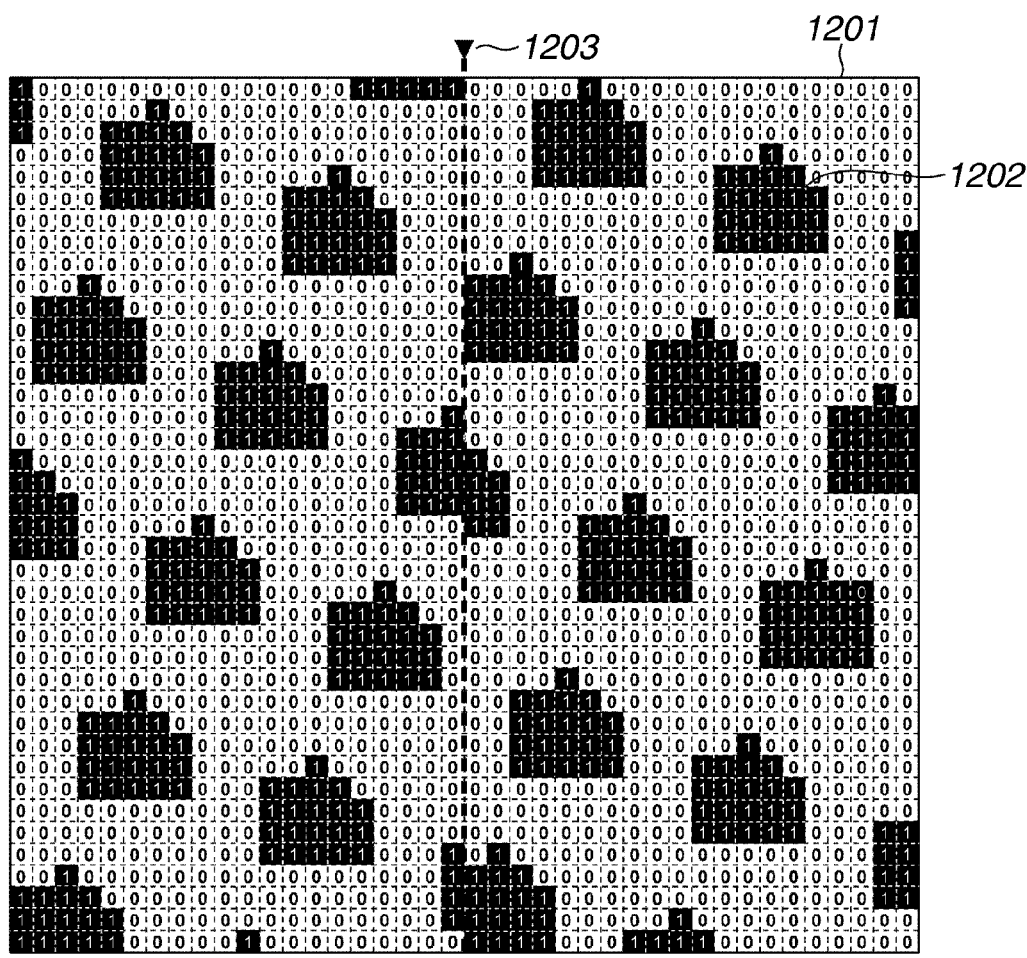
Figure 12B:
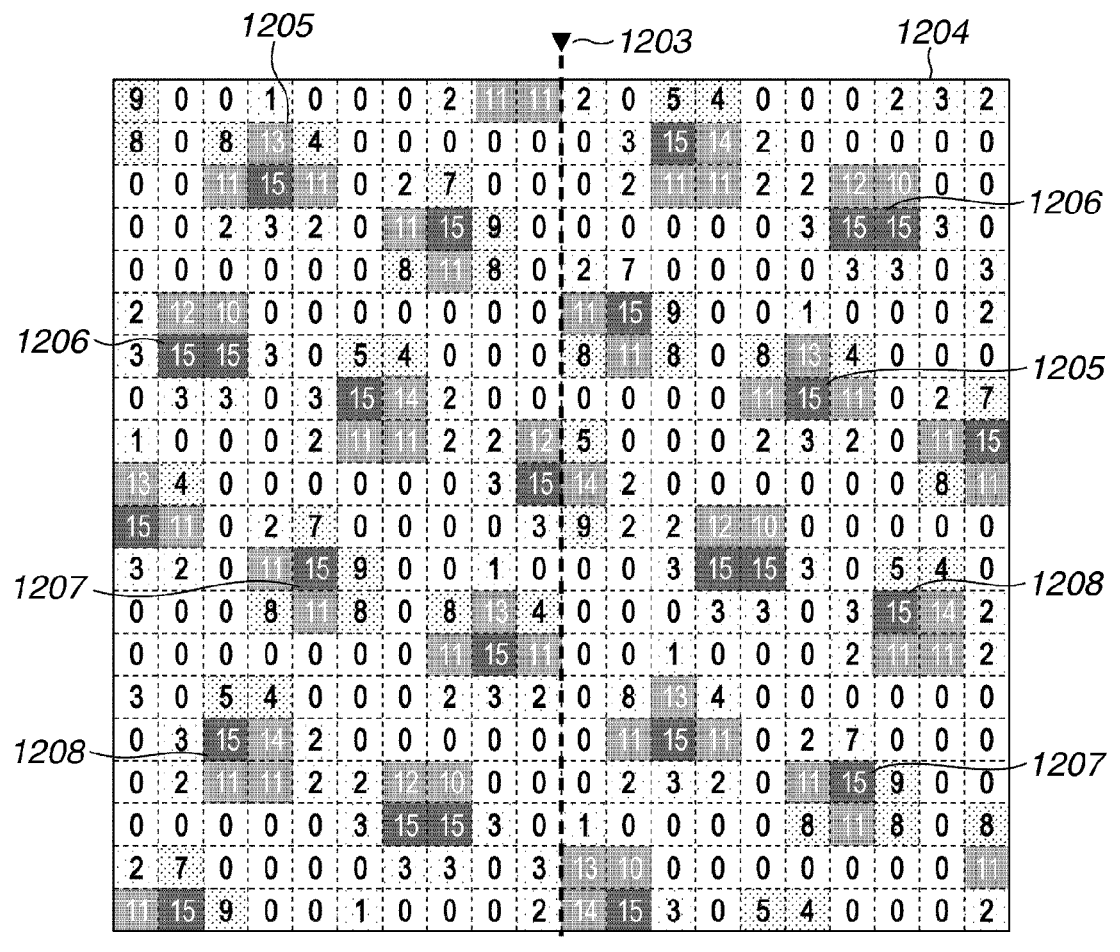
Figure 13A:
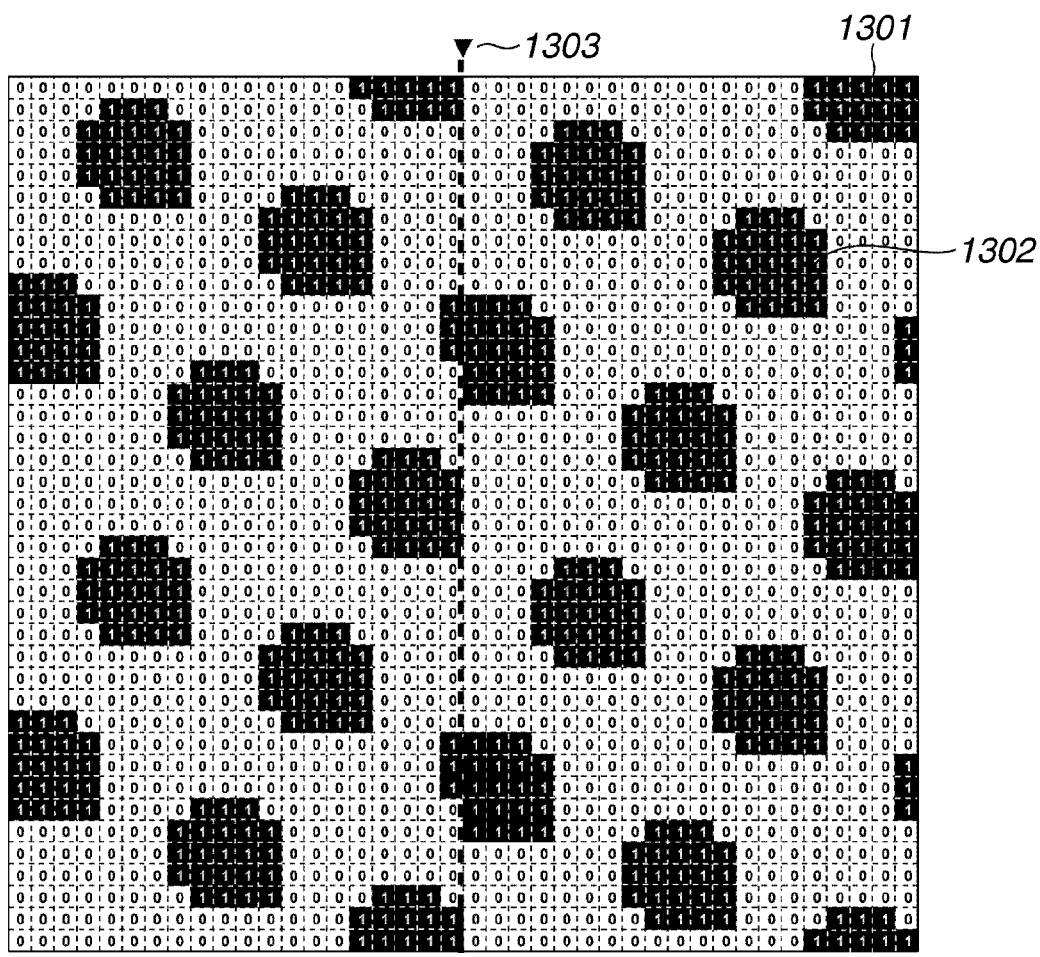
Figure 13B:
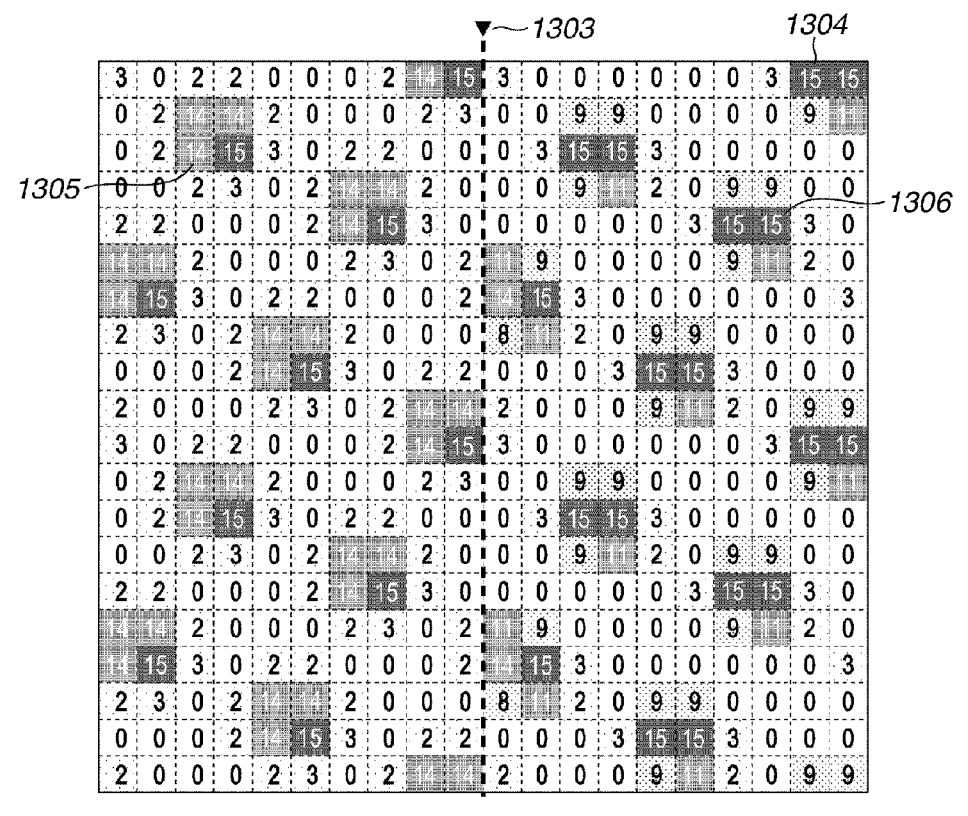

FIGS. 12A and 12B illustrate examples of image data resulting from applying the screen processing by the halftone processing unit 107 based on the dither matrix 801 of which vector components satisfy any one of the vector conditions. FIGS. 13A and 13B illustrate examples of image data resulting from applying the screen processing by the halftone processing unit 107 based on the dither matrix 1101 illustrated in FIG. 11.

FIG. 12A illustrates image data 1201 which is obtained by applying the screen processing to image data having uniform pixel values in a single plane based on the dither matrix 801 and then applying the 1200-dpi shifting processing to the image data read from the storage unit 108. In the image data 1201, the region to the right of a shifting point 1203 has been downwardly shifted by one pixel. The image data 1201 is area gradation image data resulting from applying the screen processing to continuous tone image data having uniform pixel values in the single plane. Therefore, a halftone dot (dot data) 1202 is periodically and repetitively arranged according to the vector components of the dither matrix 801.

FIG. 12B illustrates image data 1204 which is 600-dpi image data which is obtained by applying the pseudo high-resolution conversion processing to the image data 1201 illustrated in FIG. 12A. In the image data 1204, four different halftone dots 1205 to 1208 are periodically and repetitively arranged in the region to the left of the shifting point 1203, and the same halftone dots 1205 to 1208 are periodically and repetitively arranged also in the region to the right of the shifting point 1203.

FIG. 13A illustrates image data 1301 which is obtained by applying the screen processing to image data having uniform pixel values in a single plane based on the dither matrix 1101 and then applying the 1200-dpi shifting processing to the image data read from the storage unit 108. In the image data 1301, the region to the right of a shifting point 1303 has been downwardly shifted by one pixel. The image data 1301 is area gradation image data resulting from applying the screen processing to continuous tone image data having uniform pixel values in the single plane. Therefore, a halftone dot 1302 is repetitively arranged according to the vector components of the dither matrix 1101. In the dither matrix 1101 illustrated in FIG. 11, a halftone dot cell 1102 is periodically and repetitively arranged, and the interval of the halftone dots is represented by two vectors u (8, 4) and v (−4, 8). The two vector components of the dither matrix 1101 are a combination of even numbers, the vector condition of the dither matrix 1101 does not agree with that of the dither matrix used according to the present exemplary embodiment in a limited way.

FIG. 13B illustrates image data 1304 which is 600-dpi image data resulting from applying the pseudo high-resolution conversion processing to the 1200-dpi image data 1301 read from the storage unit 108. In the image data 1304, one type of a halftone dot 1305 is uniformly arranged in the region to the left of the shifting point 1303, and a halftone dot 1306 which is different from the halftone dot 1305 in the left region is repetitively arranged in the region to the right of the shifting point 1303.

More specifically, in the image data 1304 illustrated in FIG. 13B, different types (profiles) of halftone dots appear in the regions to the right and to the left of the shifting point 1303, and therefore the image forming unit 101 forms different multicolor toner images in the regions to the right and to the left of the shifting point 1303 on a recording medium. Thus, the image data is reproduced with different densities and tints in the regions to the right and to the left of the shifting point on the recording medium, resulting in visually noticeable image quality degradation. In other words, when the image processing unit 102 applies the screen processing to image data based on a dither matrix of which vector components are both even numbers, applies the 1200-dpi shifting processing, and then applies the pseudo high-resolution conversion processing to the 1200-dpi image data to obtain 600-dpi image data, image quality degradation arises.

On the other hand, in the image data 1204 based on the dither matrix having limited vector components according to the present exemplary embodiment, the halftone dot patterns appearing in the regions to the right and to the left of the shifting point remain unchanged, and the image data is reproduced with an equivalent density and tint in the right and left regions on the recording medium. Thus, image quality degradation is not visually noticeable. More specifically, when the image processing unit 102 applies the screen processing to the image data based on a dither matrix of which vector components satisfy any one of the vector conditions, applies the shifting processing to the 1200-dpi image data, and then applies the pseudo high-resolution conversion processing to 600 dpi to the image data, image quality degradation is not noticeable.

Even if halftone dot patterns are different in the regions to the right and to the left of the shifting point, high-lightness toner such as toner of the yellow (Y) color plane may provide small density changes due to differences in halftone dot patterns. Therefore, the halftone processing unit 107 may apply the halftone processing based on a dither matrix which does not limit the vector components for some colors, such as the Y color plane. In other words, the halftone processing unit 107 applies the halftone processing based on a dither matrix satisfying any one of the vector conditions to image data having the cyan (C) color plane, the magenta (M) color plane, and the black (K) color plane.

As described above, the present exemplary embodiment applies the shifting processing to high-resolution image data resulting from the screen processing, and then applies the pseudo high-resolution conversion processing to the image data to obtain low-resolution image data. In this case, limiting the two vector components of the dither matrix used for the screen processing to a combination of an even number and an odd number can prevent image quality degradation resulting from applying the pseudo high-resolution conversion processing after the shifting processing. As a result, if the image processing unit 102 performs the shifting processing for correcting a curve of the laser beam scanning line with a high resolution and then the pseudo high-resolution conversion processing, stable halftone dots can be reproduced with little color unevenness around the boundary of the shifting point. Since the curve of the laser beam scanning line is corrected with a high resolution, the pixel level difference generated by the shifting processing can be reduced. This enables preventing image quality degradation due to the pixel level difference in comparison with a case of the shifting processing with a low resolution.

According to the first exemplary embodiment, the image forming unit 101 drives laser scanning with an identical print resolution (600 dpi) both in the main scanning direction and the sub-scanning direction. The pseudo high-resolution conversion processing according to the first exemplary embodiment converts the image data having the rasterization resolution (1200 dpi) into image data having the print resolution (600 dpi), a half of the rasterization resolution, both in the main scanning direction and the sub-scanning direction. According to a second exemplary embodiment, the image forming unit 101 drives laser scanning with different print resolutions in the main scanning direction and the sub-scanning direction, and the pseudo high-resolution conversion processing converts the resolution with different magnifications in the main scanning direction and the sub-scanning direction.

According to the present exemplary embodiment, the image forming unit 101 drives laser scanning with a 600-dpi resolution in the main scanning direction and a 400-dpi resolution in the sub-scanning direction. The present exemplary embodiment differs from the first exemplary embodiment only in a partial configuration of the halftone processing unit 107 and the pseudo high-resolution conversion processing unit 109. Constituent elements equivalent to those in the first exemplary embodiment are assigned the same reference numerals and redundant descriptions will be omitted. Only different elements will be described below.

[Halftone Processing]

The following describes detailed operations performed by the halftone processing unit 107 according to the present exemplary embodiment.

To simplify descriptions of the present exemplary embodiment, the halftone processing unit 107 is assumed to perform the screen processing based on a 1200-dpi dither matrix in any case. Therefore, the image generation unit 104 according to the present exemplary embodiment has only a mode for generating image data through rasterization with a 1200-dpi resolution, and an instruction on resolution for image data generation is not included in the print data. Similar to the first exemplary embodiment, the image generation unit 104 may generate image data, for example, with a 600-dpi resolution suitable for the driving condition of the image forming unit 101, and change the dither matrix used by the halftone processing unit 107 from the 1200-dpi dither matrix to the 600-dpi dither matrix. In this case, of course, the halftone processing unit 107 uses a dither matrix according to the resolution driven by the image forming unit 101.

According to the present exemplary embodiment, for each pixel of the 1200-dpi image data, the halftone processing unit 107 reads a threshold value from the position corresponding to the relevant pixel position of the dither matrix 801, and compares the threshold value with the pixel value. The halftone processing unit 107 outputs 1 when the pixel value is equal to or larger than the threshold value or outputs 0 otherwise, thus performing binarization.

The dither matrix used according to the present exemplary embodiment has limited vector components that satisfy the vector conditions described below. To simplify descriptions, although one dither matrix will be described below, a dither matrix having vector components different for each of the C, M, Y, and K color planes may be used. Although, according to the present exemplary embodiment, a dither matrix containing halftone dot cells having the same threshold values periodically and repetitively arranged is used, other techniques such as a submatrix may be used. A submatrix enables obtaining sufficient number of gradations by combining a plurality of types of halftone dot cells having different threshold values.

[Pseudo High Resolution Conversion Processing]

The following describes detailed operations performed by the pseudo high-resolution conversion processing unit 109 of the image processing unit 102 according to the present exemplary embodiment, with reference to FIGS. 14A to 14D.

FIGS. 14A to 14D schematically illustrate the pseudo high-resolution conversion processing according to the present exemplary embodiment.

The pseudo high-resolution conversion processing unit 109 applies the pseudo high-resolution conversion processing to the image data read from the storage unit 108 to convert it into image data having a 600-dpi resolution in the main scanning direction and a 400-dpi resolution in the sub-scanning direction.

FIG. 14A illustrates a relation between image data 1001 and a processing rectangle 1403 in the pseudo high-resolution conversion processing. FIG. 14A illustrates a relation between the 1200-dpi image data 1001 input to the pseudo high-resolution conversion processing unit 109 and the processing rectangle 1403 containing 15 pixels centering on a target pixel 1402. In the pseudo high-resolution conversion processing, the pseudo high-resolution conversion processing unit 109 resamples data while moving the processing rectangle 1403 and performs the product-sum operation within the region of the processing rectangle 1403. The pseudo high-resolution conversion processing according to the present exemplary embodiment converts the resolution in the main scanning direction from 1200 dpi to 600 dpi, and converts the resolution in the sub-scanning direction from 1200 dpi to 400 dpi. Therefore, the pseudo high-resolution conversion processing unit 109 sequentially applies the relevant processing to the 1200-dpi image data 1001 while moving the target pixel 1402 of the processing rectangle 1403 to sampling positions 1401 which are arranged every two pixels in the main scanning direction and every three pixels in the sub-scanning direction. The interval of the sampling positions (hereinbelow referred to as a sampling interval) is determined by the reduction rate of the resolutions of the image data 1001 in the main scanning direction and the sub-scanning direction. When image data having 1200-dpi resolutions in the main scanning direction and in the sub-scanning direction is converted into image data having a 600-dpi resolution in the main scanning direction and a 400-dpi resolution in the sub-scanning direction as according to the present exemplary embodiment, the sampling interval is two (=1200/600) pixels in the main scanning direction and three (=1200/400) pixels in the sub-scanning direction.

FIG. 14B illustrates the processing rectangle 1403 for the product-sum operation. FIG. 14C illustrates a product-sum operation coefficient 1404 used for the product-sum operation. As described above, the processing rectangle 1403 contains 15 pixels centering on the target pixel 1402. The product-sum operation coefficient 1404 includes 15 coefficients "a" respectively corresponding to the 15 pixels constituting the processing rectangle 1403. When the target pixel 1402 has coordinates (i, j) and a pixel value I(i, j), the output OUT can be calculated by formula (2) through the product-sum operation.

[Formula 2]

$$\text{OUT} = \frac{15}{\sum_{k=-1}^{1}\sum_{l=-2}^{2} a_{(k,l)}} \sum_{k=-1}^{1}\sum_{l=-2}^{2} I_{(i+k,j+l)} a_{(k,l)} \quad (2)$$

More specifically, since the pixel value I(i, j) is 0 or 1, the pseudo high-resolution conversion processing unit 109 calculates the product of each pixel of the processing rectangle 1403 and the product-sum operation coefficient 1404 corresponding to the coordinates of the relevant pixel, sums up the products for 15 pixels, and then normalizes the result to 15. Thus, the number of gradations of the image data can be converted from 2 to 16 (16-valued image data) while converting the 1200-dpi resolution in the main scanning direction to 600 dpi, and converting the 1200-dpi resolution in the sub-scanning direction to 400 dpi.

FIG. 14D illustrates an example of product-sum operation coefficients according to the present exemplary embodiment. For example, performing the product-sum operation using the product-sum operation coefficient 1404 enables obtaining the effect of spot-multiplexing, achieving printing with a pseudo higher print resolution than the resolution of the image data.

The following describes vectors of a 1200-dpi dither matrix according to the present exemplary embodiment, with reference to FIGS. 8A, 8B, 12A, and 12B.

Although described in detail below, according to the present exemplary embodiment in which the sampling interval in the main scanning direction and the sampling interval in the sub-scanning direction are "2" and "3", respectively, the dither matrix set in step S903 satisfies the following vector condition: (1) Neither of the sub-scanning direction components of the two vectors u and v of the dither matrix is a multiple of "3" which is the sampling interval in the sub-scanning direction. In other words, dividing each of the sub-scanning direction components of the vectors u and v by the sampling interval gives a remainder other than "0".

Vectors u (8, 3) and v (−3, 8) which are vector components of the dither matrix 801 have an equal length and perpendicularly intersect with each other. In addition, with either vector, the main scanning direction component and the sub-scanning direction component are a combination of an even number and an odd number.

According to the present exemplary embodiment, since the sampling interval in the sub-scanning direction of the pseudo high-resolution conversion processing is "3" and the sub-scanning direction component of the first vector u of the dither matrix 801 is "3", dividing the sub-scanning direction component of the first vector u by the sampling interval gives a remainder "0". Further, since the sub-scanning direction component of the second vector v of the dither matrix 801 is "8", dividing the sub-scanning direction component of the second vector v by the sampling interval gives a remainder "2". Therefore, the dither matrix 801 satisfies the above-described vector condition.

The following describes in detail how the result of the pseudo high-resolution conversion processing changes depending on whether or not the two vector components of the 1200-dpi dither matrix are limited by the vector condition according to the present exemplary embodiment, with reference to FIGS. 8A, 8B, 12A, 12B, 15, 16, 17A, and 17B.

Figure 15:
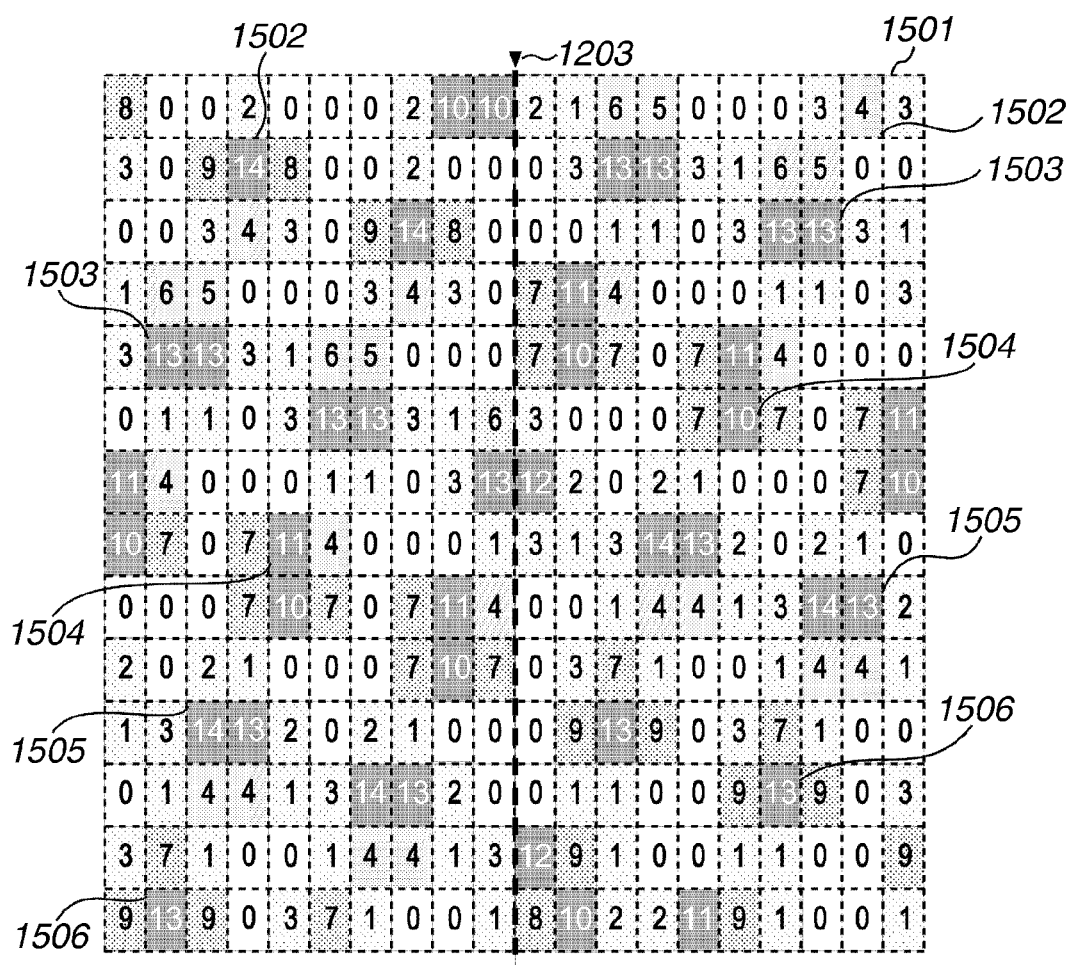
FIG. 15 illustrates an example of image data.

FIG. 15 illustrate an example of image data resulting from applying the screen processing to image data based on the dither matrix 801 satisfying the vector condition according to the present exemplary embodiment, and then applying the pseudo high-resolution conversion processing according to the present exemplary embodiment to the image data 1201.

Figure 16:
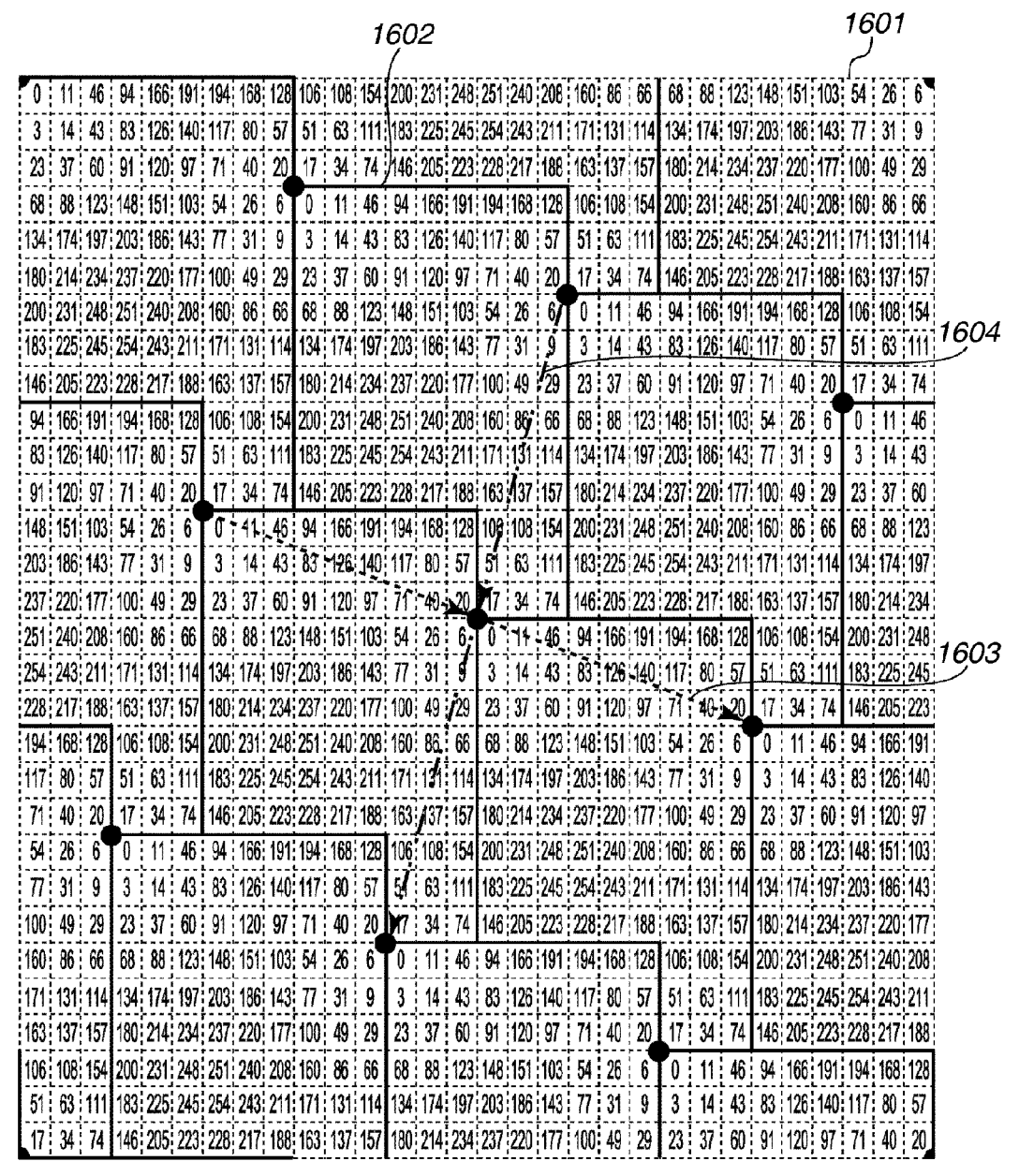
Figure 17A:
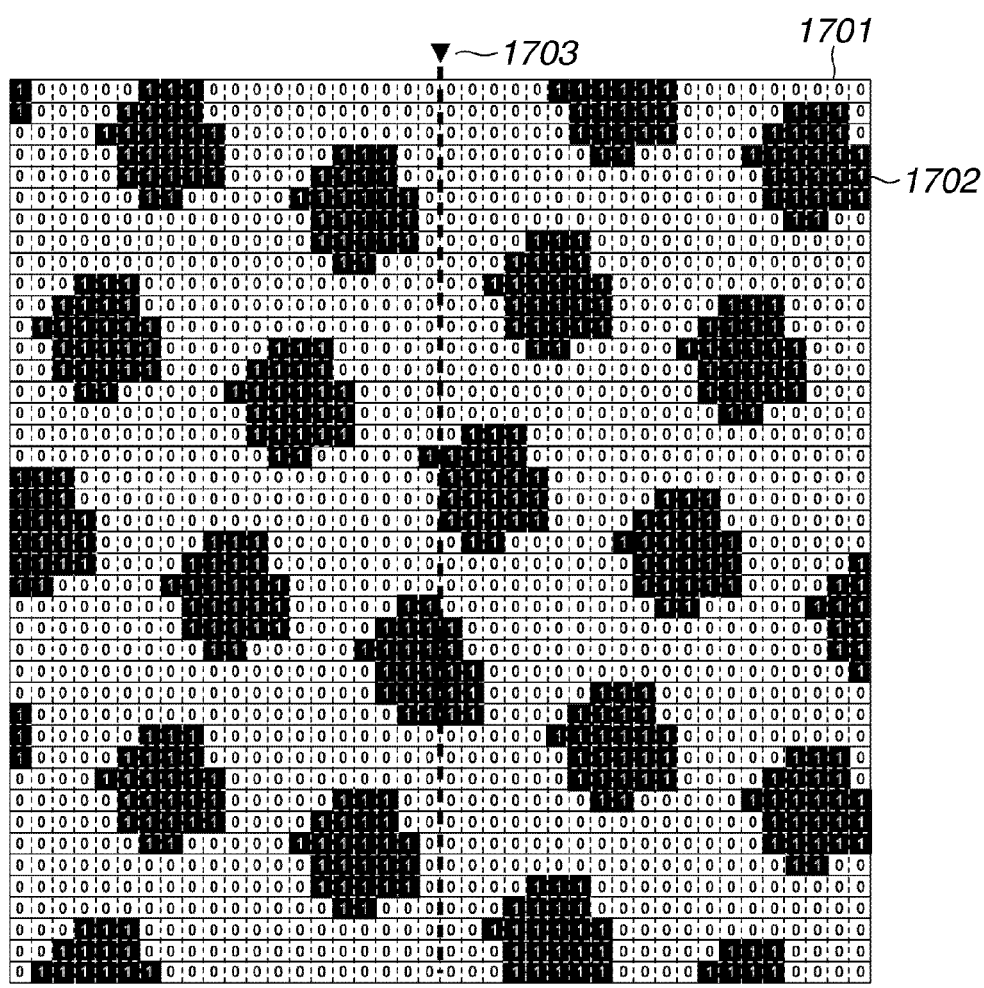
Figure 17B:
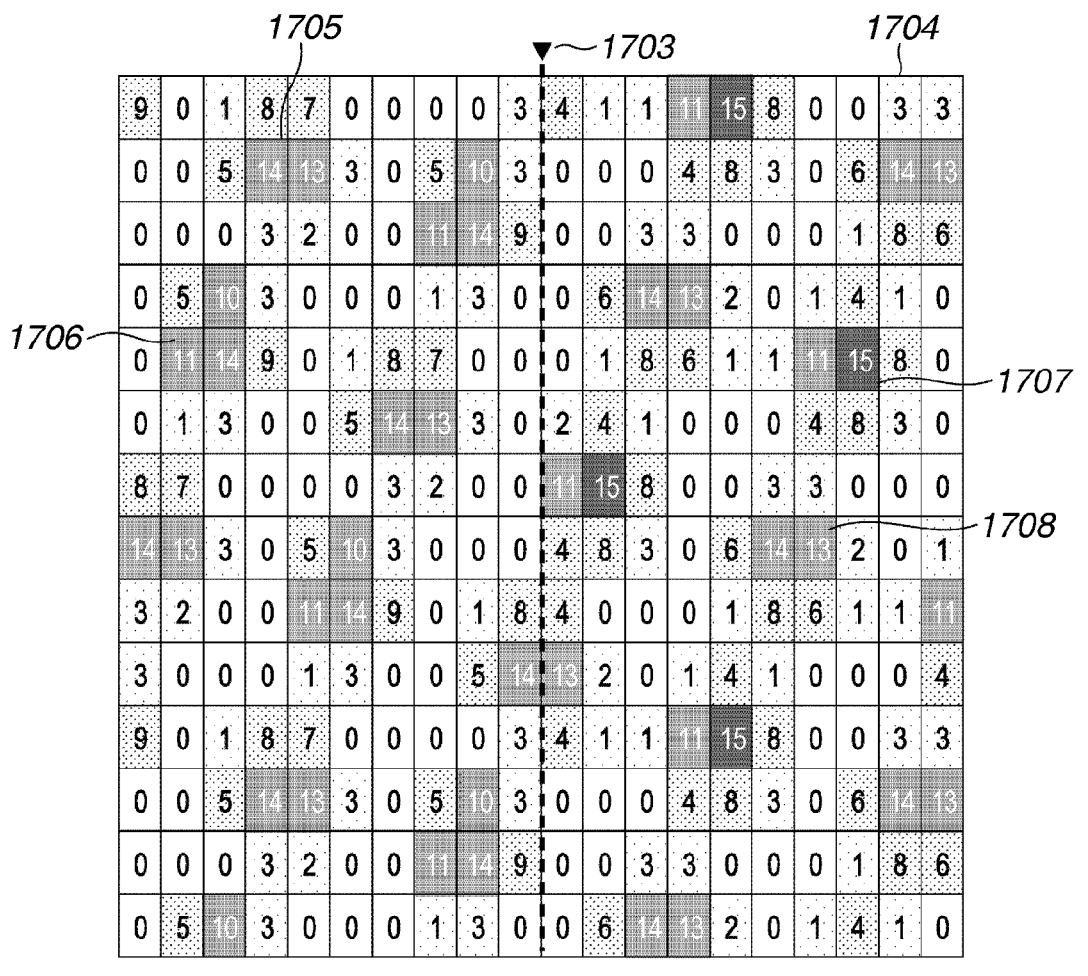

FIG. 16 illustrates an example of a dither matrix of which vector components do not satisfy the vector condition according to the present exemplary embodiment. FIGS. 17A and 17B illustrate examples of image data resulting from applying the screen processing by the halftone processing unit 107 based on a dither matrix 1601.

FIG. 15 illustrates image data 1501 which has a 600-dpi resolution in the main scanning direction and a 400-dpi resolution in the sub-scanning direction resulting from applying the pseudo high-resolution conversion processing according to the present exemplary embodiment to the 1200-dpi image data 1201 illustrated in FIG. 12 read from the storage unit 108. As described above, the image data 1201 illustrated in FIG. 12 is 1200-dpi image data resulting from applying the screen processing to single-plane image data having uniform pixel values based on the dither matrix 801, and then reading the image data from the storage unit 108. In the image data 1501, four different halftone dots 1502 to 1506 are periodically and repetitively arranged in the region to the left of the shifting point 1203, and the same halftone dots 1502 to 1506 are also periodically and repetitively arranged in the region to the right of the shifting point 1203. Although all halftone dots are not illustrated in FIG. 15, when the dither matrix 801 is used, six different halftone dots are generated in the image data which has undergone the pseudo high-resolution conversion processing. The same halftone dot patterns are generated in the regions to the right and to the left of the shifting point 1303.

FIG. 17A illustrates 1200-dpi image data 1701 which is obtained by applying the screen processing to single-plane image data having uniform pixel values based on the dither matrix 1601, and then reading the image data from the storage unit 108. In the image data 1701, the region to the right of a shifting point 1703 has been downwardly shifted by one pixel. The image data 1701 is area gradation image data resulting from applying the screen processing to continuous tone image data having uniform pixel values, and therefore a halftone dot 1702 is periodically and repetitively arranged therein. In the dither matrix 1601 illustrated in FIG. 16, a halftone dot cell 1602 is repetitively arranged according to the vector components, and an interval of the halftone dot cells 1602 is represented by vectors u (9, 3) and v (−3, 9). With the dither matrix 1601, since the sub-scanning direction component of the first vector u is "3" and the sampling interval in the sub-scanning direction in the pseudo high-resolution conversion processing according to the present exemplary embodiment is "3", dividing the sub-scanning direction component by the sampling interval gives a remainder "0". Further, since the sub-scanning direction component of the second vector v of the dither matrix 1601 is "9", dividing the sub-scanning direction component of the second vector v by the sampling interval also gives a remainder "0". Therefore, the dither matrix 1601 does not satisfy the vector condition according to the present exemplary embodiment.

FIG. 17B illustrates image data 1704 which has a 600-dpi resolution in the main scanning direction and a 400-dpi resolution in the sub-scanning direction resulting from applying the pseudo high-resolution conversion processing to 1200-dpi image data 1701 read from the storage unit 108. In the image data 1704, two different halftone dots 1705 and 1706 are periodically and repetitively arranged in the region to the left of the shifting point 1703, and two different halftone dots 1707 and 1708 are periodically and repetitively arranged in the region to the right of the shifting point 1703.

Although the image data 1501 provides identical halftone dot patterns appearing in the regions to the right and to the left of the shifting point, the image data 1704 provides different halftone dot patterns appearing in the regions to the right and to the left of the shifting point. Although the image data before the screen processing has uniformly identical pixel values, the image data 1704 provides different halftone dot patterns. Therefore, a multicolor toner image formed on the recording medium by the image forming unit 101 provides different halftone dot patterns in the regions to the right and to the left of the shifting point. Thus, the image data is reproduced with different densities and tints in the regions to the right and to the left of the shifting point on the recording medium, resulting in image quality degradation due to color unevenness.

On the other hand, image data 1504 based on a dither matrix satisfying the vector condition according to the present exemplary embodiment provides identical halftone dot patterns appearing in the regions, so that image quality degradation due to color unevenness can be suppressed.

As described above, according to the present exemplary embodiment, the combination of the sub-scanning direction components of the two vectors of the dither matrix in the pseudo high-resolution conversion processing is limited to the one that gives a remainder other than "0" when each of the sub-scanning direction component is divided by the sampling interval in the sub-scanning direction. Thus, even if an image forming apparatus having different resolutions in the main scanning direction and the sub-scanning direction corrects a curve of the laser beam scanning line with a high resolution, halftone dots can be stably reproduced. Further, since the shifting processing is applied with a high resolution, the pixel level difference generated at the shifting point can be made smaller than that in a case of the shifting processing with a low resolution, making the pixel level difference less noticeable.

According to the first exemplary embodiment, a sampling interval in the main scanning direction and a sampling interval in the sub-scanning direction are both "2". According to the second exemplary embodiment, a sampling interval in the main scanning direction and a sampling interval in the sub-scanning direction are "2" and "3", respectively. According to a third exemplary embodiment, a sampling interval in the main scanning direction and a sampling interval in the sub-scanning direction will be generalized as P and Q, respectively. Unless otherwise described, the image processing apparatus according to the present exemplary embodiment employs the similar configuration to that according to the first exemplary embodiment.

[Generalization of Vector Conditions]

As described above, the sampling intervals are determined by the reduction rate of the resolution in the main scanning direction and the resolution in the sub-scanning direction in the pseudo high-resolution processing. More specifically, in the case where an image before conversion having a main scanning direction resolution of M1 [dpi] and a sub-scanning direction resolution of N1 [dpi] is reduced to an image having a main scanning direction resolution of M2 [dpi] and a sub-scanning direction resolution of N2 [dpi], a sampling interval P in the main scanning direction and a sampling interval Q in the sub-scanning direction are calculated by formula (3).

[Formula 3]

$$P = \frac{M1}{M2} \qquad (3)$$
$$Q = \frac{N1}{N2}$$

With the resolutions M1 and M2, the sampling interval P is a natural number. Similarly, with the resolutions N1 and N2, the sampling interval Q is a natural number.

The following describes vector conditions in a case where the sampling interval in the main scanning direction is P pixels and the sampling interval in the sub-scanning direction is Q pixels, and the vector components of two vectors u and v of the dither matrix are (x1 pixels, y1 pixels) and (x2 pixels, y2 pixels), respectively, with reference to FIG. 18. The sampling intervals P and Q are natural numbers, and the vector components x1, y1, x2, and y2 are integers. FIG. 18 illustrates an arrangement of halftone dot cells determined by the two vectors u and v when the one-pixel shifting processing is applied in the sub-scanning (downward) direction.

As illustrated in FIG. 18, when the coordinates of a halftone dot position C1 indicating the position of the halftone dot cell are (0, 0), the coordinates of a halftone dot position C2 distant from the halftone dot position C1 by m times the vector u and n times the vector v are (nx1+mx2, ny1+my2+1). In consideration that both the sampling position and the halftone dot cell position are periodic, a condition that low-resolution halftone dot patterns appearing in the regions to the right and to the left of the shifting point remain unchanged after the pseudo high-resolution conversion processing is applied to the image data (resulting from the shifting processing) is as follows. In image data resulting from the shifting processing, halftone dot cells at the sampling positions exist in the regions to the right and to the left of the shifting point. This condition is referred to as a vector condition.

Therefore, if the vector components x1, y1, x2, and y2 of the dither matrix allow the existence of at least one set of integers n and m satisfying the following congruence relation in a modular arithmetic system (clock arithmetic), the dither matrix satisfies the vector condition. In the following congruence relation, the vector components x1 and y1 of the dither matrix are multiplied by n, and the vector components x2 and y2 thereof are multiplied by m.

[Formula 4]

$$nx_1 + mx_2 \equiv 0 \pmod{P}$$

$$ny_1 + my_2 + 1 \equiv 0 \pmod{Q} \qquad (4)$$

The dither matrix satisfying the vector condition when applying the above-described shifting processing in the downward direction satisfies the vector condition when the one-pixel shifting processing in the upward direction is applied. This can be understood from the fact that replacing the integers n and m in the above-described vector condition with −n and −m, respectively, satisfies the vector condition in the case of the shifting processing in the downward direction. Therefore, with the dither matrix satisfying the above-described vector condition, when the pseudo high-resolution conversion processing is applied after the shifting processing, the low-resolution halftone dot patterns appearing in the regions to the right and to the left of the shifting point remain unchanged. Thus, occurrence of color unevenness can be suppressed.

An embodiment of the present invention can suppress occurrence of color unevenness in an image printed after shifting processing is applied to high-resolution image data and then the pseudo high-resolution conversion processing is applied to the image data resulting from the shifting processing.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims priority from Japanese Patent Application No. 2012-106121 filed May 7, 2012, which is hereby incorporated by reference herein in its entirety.

What is claimed is:

1. An image processing apparatus comprising:
a halftone processing unit configured to apply halftone processing based on a dither matrix to image data;
a correction unit configured, with respect to the image data to which the halftone processing has been applied, to shift a pixel of the image data in a sub-scanning direction at a correction position in a main scanning direction which is determined based on correction information for correcting a distortion due to a curve of a scanning line for forming an image according to the image data; and
a resolution conversion unit configured to apply resolution conversion processing for lowering a resolution of image data to the corrected image data,
wherein the dither matrix results in that the image data to which the resolution conversion processing has been applied includes matched portions of halftone dot patterns appearing in regions preceding and following the correction position in the main scanning direction.

2. An image processing apparatus comprising:
a halftone processing unit configured to apply halftone processing for generating a halftone dot based on a dither matrix to image data;
a correction unit configured, with respect to the image data to which the halftone processing has been applied to, to shift a pixel of the image data in a sub-scanning direction at a correction position in a main scanning direction which is determined based on correction information for correcting a distortion due to a curve of a scanning line for forming an image according to the image data;

a resolution conversion unit configured to apply resolution conversion processing, while sequentially moving a sampling position, to the corrected image data to generate image data having a converted resolution, wherein, in regions preceding and following the correction position in the main scanning direction, the dither matrix generates, in the halftone processing, a halftone dot such that any one of sampling positions for a halftone dot in one region equals any one of sampling positions for a halftone dot in the other region.

3. The image processing apparatus according to claim 2, wherein the halftone processing unit applies halftone processing to image data having a 1200-dpi resolution, and wherein the resolution conversion unit applies the resolution conversion processing to generate image data having a 600-dpi resolution.

4. The image processing apparatus according to claim 2, further comprising:

an instruction unit configured to instruct a resolution for rasterizing received print data into the image data; and a generation unit configured, in a case where the resolution instructed by the instruction unit is a first resolution, to rasterize the print data with the first resolution to generate image data having the first resolution, and in a case where the resolution instructed by the instruction unit is a second resolution which is lower than the first resolution, to rasterize the print data with the second resolution to generate image data having the second resolution, wherein, in a case where the resolution of the image data generated by the generation unit is the first resolution, the resolution conversion unit applies the resolution conversion processing to the image data having the first resolution, and in a case where the resolution of the image data generated by the generation unit is the second resolution, the resolution conversion unit does not apply the resolution conversion processing to the image data having the second resolution.

5. The image processing apparatus according to claim 4, wherein the dither matrix is a binary dither matrix, and wherein, in a case where the resolution of the image data generated by the generation unit is the first resolution, the halftone processing unit performs halftone processing based on the dither matrix, and in a case where the resolution of the image data generated by the generation unit is the second resolution, the halftone processing unit performs halftone processing based on a multivalued dither matrix different from the dither matrix.

6. The image processing apparatus according to claim 4, wherein the first resolution is 1200 dpi and the second resolution is 600 dpi.

7. The image processing apparatus according to claim 2, wherein the image data includes image data of a color plane for each of process colors, and wherein, among the image data pieces, the halftone processing unit applies halftone processing based on the dither matrix to image data pieces of color planes for cyan, magenta, and black among the process colors.

8. An image processing apparatus comprising:

a halftone processing unit configured to apply halftone processing for generating a halftone dot based on a dither matrix to image data;

a correction unit configured, with respect to the image data to which the halftone processing has been applied, to shift a pixel of the image data in a sub-scanning direction based on correction information for correcting a distortion due to a curve of a scanning line for forming an image according to the image data;

a resolution conversion unit configured to apply resolution conversion processing with a two-pixel sampling interval in the sub-scanning direction to the corrected image data to generate image data having a converted resolution, wherein the dither matrix includes information about two vectors representing an arrangement of the halftone dot, and wherein the two vectors satisfy any one of the following conditions:

(1) sub-scanning direction components of the two vectors are an odd number and an even number, respectively, and one of the two vectors, having a sub-scanning direction component of an odd number, has a main scanning direction component of an even number, (2) sub-scanning direction components of the two vectors are an odd number and an even number, respectively, and main scanning direction components of the two vectors are both an odd number, (3) sub-scanning direction components of the two vectors are both an odd number, and main scanning direction components of the two vectors are both an even number, and (4) sub-scanning direction components of the two vectors are both an odd number, and main scanning direction components of the two vectors are an odd number and an even number, respectively.

9. An image processing apparatus comprising:

a halftone processing unit configured to apply halftone processing for generating a halftone dot based on a dither matrix to image data;

a correction unit configured, with respect to the image data to which the halftone processing has been applied, to shift a pixel of the image data in a sub-scanning direction based on correction information for correcting a distortion due to a curve of a scanning line for forming an image according to the image data; and a resolution conversion unit configured to apply resolution conversion processing with a two-pixel sampling interval in a main scanning direction and a three-pixel sampling interval in the sub-scanning direction to the corrected image data to generate image data having a converted resolution, wherein the dither matrix includes information about two vectors representing an arrangement of the halftone dot, and wherein neither of sub-scanning direction components of the two vectors is divisible by the sampling interval in the sub-scanning direction.

10. An image processing apparatus comprising:

a halftone processing unit configured to apply halftone processing for generating a halftone dot based on a dither matrix to image data;

a correction unit configured, with respect to the image data to which the halftone processing has been applied, to shift a pixel of the image data in a sub-scanning direction based on correction information for correcting a distortion due to a curve of a scanning line for forming an image according to the image data; and a resolution conversion unit configured to apply resolution conversion processing with a P-pixel sampling interval in a main scanning direction and a Q-pixel sampling interval in the sub-scanning direction to the corrected image data to generate image data having a converted resolution, wherein the dither matrix includes information about two vectors representing an arrangement of the halftone dot, wherein a main scanning direction component and a sub-scanning direction component of one of the two vectors are respectively x1 and y1 pixels, and a main scanning direction component and a sub-scanning direction component of the other of the two vectors are respectively x2 and y2 pixels, and wherein, as the main scanning direction component and the sub-scanning direction component of each of the two vectors, there is at least one combination of integers n and m which satisfy the following congruence relation:

$$nx_1+mx_2 \equiv 0 \pmod{P}$$

$$ny_1+my_2+1 \equiv 0 \pmod{Q} \quad \text{[Formula 1]}.$$

11. The image processing apparatus according to claim 8, wherein the two vectors have an equal length and perpendicularly intersect with each other, and the main scanning direction component and the sub-scanning direction component of either vector are a combination of an even number and an odd number.

12. A method for processing an image, the method comprising:
   applying halftone processing based on a dither matrix to image data;
   with respect to the image data to which the halftone processing has been applied, shifting a pixel of the image data in a sub-scanning direction at a correction position in a main scanning direction which is determined based on correction information for correcting a distortion due to a curve of a scanning line for forming an image according to the image data; and
   applying resolution conversion processing for lowering a resolution of image data to the corrected image data,
   wherein the dither matrix results in that the image data to which the resolution conversion processing has been applied includes matched portions of halftone dot patterns appearing in regions preceding and following the correction position in the main scanning direction.

13. A method for processing an image, the method comprising:
   applying halftone processing for generating a halftone dot based on a dither matrix to image data;
   with respect to the image data to which the halftone processing has been applied, shifting a pixel of the image data in a sub-scanning direction at a correction position in a main scanning direction which is determined based on correction information for correcting a distortion due to a curve of a scanning line for forming an image according to the image data; and
   applying resolution conversion processing, while sequentially moving a sampling position, to the corrected image data to generate image data having a converted resolution,
   wherein, in regions preceding and following the correction position in the main scanning direction, the dither matrix generates, in the halftone processing, a halftone dot such that any one of sampling positions for a halftone dot in one region equals any one of sampling positions for a halftone dot in the other region.

14. A method for processing an image, the method comprising:
   applying halftone processing for generating a halftone dot based on a dither matrix to image data;
   with respect to the image data to which the halftone processing has been applied, shifting a pixel of the image data in a sub-scanning direction based on correction information for correcting a distortion due to a curve of a scanning line for forming an image according to the image data; and
   applying resolution conversion processing with a two-pixel sampling interval in the sub-scanning direction to the corrected image data to generate image data having a converted resolution,
   wherein the dither matrix includes information about two vectors representing an arrangement of the halftone dot, and
   wherein the two vectors satisfy any one of the following conditions:
   (1) sub-scanning direction components of the two vectors are an odd number and an even number, respectively, and one of the two vectors, having a sub-scanning direction component of an odd number, has a main scanning direction component of an even number,
   (2) sub-scanning direction components of the two vectors are an odd number and an even number, respectively, and main scanning direction components of the two vectors are both an odd number,
   (3) sub-scanning direction components of the two vectors are both an odd number, and main scanning direction components of the two vectors are both an even number, and
   (4) sub-scanning direction components of the two vectors are both an odd number, and main scanning direction components of the two vectors are an odd number and an even number, respectively.

15. A method for processing an image, the method comprising:
   applying halftone processing for generating a halftone dot based on a dither matrix to image data;
   with respect to the image data to which the halftone processing has been applied, shifting a pixel of the image data in a sub-scanning direction based on correction information for correcting a distortion due to a curve of a scanning line for forming an image according to the image data; and
   applying resolution conversion processing with a two-pixel sampling interval in a main scanning direction and a three-pixel sampling interval in the sub-scanning direction to the corrected image data to generate image data having a converted resolution,
   wherein the dither matrix includes information about two vectors representing an arrangement of the halftone dot, and
   wherein neither of sub-scanning direction components of the two vectors is divisible by the sampling interval in the sub-scanning direction.

16. A method for processing an image, the method comprising:
   applying halftone processing for generating a halftone dot based on a dither matrix to image data;
   with respect to the image data to which the halftone processing has been applied, shifting a pixel of the image data in a sub-scanning direction based on correction information for correcting a distortion due to a curve of a scanning line for forming an image according to the image data; and applying resolution conversion processing with a P-pixel sampling interval in a main scanning direction and a Q-pixel sampling interval in the sub-scanning direction to the corrected image data to generate image data having a converted resolution, wherein the dither matrix includes information about two vectors representing an arrangement of the halftone dot, wherein a main scanning direction component and a sub-scanning direction component of one of the two vectors are respectively x1 and y1 pixels, and a main scanning direction component and a sub-scanning direction component of the other of the two vectors are respectively x2 and y2 pixels, and wherein, as the main scanning direction component and the sub-scanning direction component of each of the two vectors, there is at least one combination of integers n and m which satisfy the following congruence relation:

$$nx_1 + mx_2 \equiv 0 \pmod{P}$$

$$ny_1 + my_2 + 1 \equiv 0 \pmod{Q} \qquad \text{[Formula 2]}.$$

17. The method according to claim 14, wherein the two vectors have an equal length, and perpendicularly intersect with each other, and wherein the main scanning direction component and the sub-scanning direction component of either vector are a combination of an even number and an odd number.

18. A non-transitory computer readable medium storing a program causing at least one micro processor to execute a method for processing an image, the method comprising:

applying halftone processing based on a dither matrix to image data; and with respect to the image data to which the halftone processing has been applied, shifting a pixel of the image data in a sub-scanning direction at a correction position in a main scanning direction which is determined based on correction information for correcting a distortion due to a curve of a scanning line for forming an image according to the image data, wherein resolution conversion processing for lowering a resolution of image data is applied to the corrected image data, and wherein the dither matrix results in that the image data to which the resolution conversion processing has been applied includes matched portions of halftone dot patterns appearing in regions preceding and following the correction position in the main scanning direction.

19. A non-transitory computer readable medium storing a program causing at least one micro processor to execute a method for processing an image, the method comprising:

applying halftone processing for generating a halftone dot based on a dither matrix to image data; and with respect to the image data to which the halftone processing has been applied, shifting a pixel of the image data in a sub-scanning direction at a correction position in a main scanning direction which is determined based on correction information for correcting a distortion due to a curve of a scanning line for forming an image according to the image data, wherein resolution conversion processing is applied, while sequentially moving a sampling position, to the corrected image data to generate image data having a converted resolution, and wherein, in regions preceding and following the correction position in the main scanning direction, the dither matrix generates, in the halftone processing, a halftone dot such that any one of sampling positions for a halftone dot in one region equals any one of sampling positions for a halftone dot in the other region.

20. A non-transitory computer readable medium storing a program causing at least one micro processor to execute a method for processing an image, the method comprising:

applying halftone processing for generating a halftone dot based on a dither matrix to image data; and with respect to the image data to which the halftone processing has been applied, shifting a pixel of the image data in a sub-scanning direction based on correction information for correcting a distortion due to a curve of a scanning line for forming an image according to the image data, wherein resolution conversion processing with a two-pixel sampling interval in the sub-scanning direction is applied to the corrected image data to generate image data having a converted resolution, wherein the dither matrix includes information about two vectors representing an arrangement of the halftone dot, and wherein the two vectors satisfy any one of the following conditions:

(1) sub-scanning direction components of the two vectors are an odd number and an even number, respectively, and one of the two vectors, having a sub-scanning direction component of an odd number, has a main scanning direction component of an even number, (2) sub-scanning direction components of the two vectors are an odd number and an even number, respectively, and main scanning direction components of the two vectors are both an odd number, (3) sub-scanning direction components of the two vectors are both an odd number, and main scanning direction components of the two vectors are both an even number, and (4) sub-scanning direction components of the two vectors are both an odd number, and main scanning direction components of the two vectors are an odd number and an even number, respectively.

21. A non-transitory computer readable medium storing a program causing at least one micro processor to execute a method for processing an image, the method comprising:

applying halftone processing for generating a halftone dot based on a dither matrix to image data; and with respect to the image data to which the halftone processing has been applied, shifting a pixel of the image data in a sub-scanning direction based on correction information for correcting a distortion due to a curve of a scanning line for forming an image according to the image data, wherein resolution conversion processing with a two-pixel sampling interval in a main scanning direction and a three-pixel sampling interval in the sub-scanning direction is applied to the corrected image data to generate image data having a converted resolution, wherein the dither matrix includes information about two vectors representing an arrangement of the halftone dot, and wherein neither of sub-scanning direction components of the two vectors is divisible by the sampling interval in the sub-scanning direction.

22. A non-transitory computer readable medium storing a program causing at least one micro processor to execute a method for processing an image, the method comprising:

applying halftone processing for generating a halftone dot based on a dither matrix to image data; and with respect to the image data to which the halftone processing has been applied, shifting a pixel of the image data in a sub-scanning direction based on correction information for correcting a distortion due to a curve of a scanning line for forming an image according to the image data, wherein resolution conversion processing with a P-pixel sampling interval in a main scanning direction and a Q-pixel sampling interval in the sub-scanning direction is applied to the corrected image data to generate image data having a converted resolution, wherein the dither matrix includes information about two vectors representing an arrangement of the halftone dot, wherein a main scanning direction component and a sub-scanning direction component of one of the two vectors are respectively x1 and y1 pixels, and a main scanning direction component and a sub-scanning direction component of the other of the two vectors are respectively x2 and y2 pixels, and wherein, as the main scanning direction component and the sub-scanning direction component of each of the two vectors, there is at least one combination of integers n and m which satisfy the following congruence relation:

$$nx_1 + mx_2 \equiv 0 \pmod{P}$$

$$ny_1 + my_2 + 1 \equiv 0 \pmod{Q} \quad \text{[Formula 2]}.$$

23. An image processing system comprising:
a halftone processing unit configured to apply halftone processing based on a dither matrix to image data;
a correction unit configured, with respect to the image data to which the halftone processing has been applied, to shift a pixel of the image data in a sub-scanning direction at a correction position in a main scanning direction which is determined based on correction information for correcting a distortion due to a curve of a scanning line for forming an image according to the image data; and
a resolution conversion unit configured to apply resolution conversion processing for lowering a resolution of image data to the corrected image data,
wherein the dither matrix results in that the image data to which the resolution conversion processing has been applied includes matched portions of halftone dot patterns appearing in regions preceding and following the correction position in the main scanning direction.

24. An image processing system comprising:
a halftone processing unit configured to apply halftone processing for generating a halftone dot based on a dither matrix to image data;
a correction unit configured, with respect to the image data to which the halftone processing has been applied, to shift a pixel in a sub-scanning direction at a correction position in a main scanning direction which is determined based on correction information for correcting a distortion due to a curve of a scanning line for forming an image according to the image data; and
a resolution conversion unit configured to apply resolution conversion processing, while sequentially moving a sampling position, to the corrected image data to generate image data having a converted resolution,
wherein, in regions preceding and following the correction position in the main scanning direction, the dither matrix generates, in the halftone processing, a halftone dot such that any one of sampling positions for a halftone dot in one region equals any one of sampling positions for a halftone dot in the other region.

25. An image processing system comprising:
a halftone processing unit configured to apply halftone processing for generating a halftone dot based on a dither matrix to image data;
a correction unit configured, with respect to the image data to which the halftone processing has been applied, to shift of the image data a pixel in a sub-scanning direction based on correction information for correcting a distortion due to a curve of a scanning line for forming an image according to the image data; and
a resolution conversion unit configured to apply resolution conversion processing with a two-pixel sampling interval in the sub-scanning direction to the corrected image data to generate image data having a converted resolution,
wherein the dither matrix includes information about two vectors representing an arrangement of the halftone dot, and
wherein the two vectors satisfy any one of the following conditions:
(1) sub-scanning direction components of the two vectors are an odd number and an even number, respectively, and one of the two vectors, having a sub-scanning direction component of an odd number, has a main scanning direction component of an even number,
(2) sub-scanning direction components of the two vectors are an odd number and an even number, respectively, and main scanning direction components of the two vectors are both an odd number,
(3) sub-scanning direction components of the two vectors are both an odd number, and main scanning direction components of the two vectors are both an even number, and
(4) sub-scanning direction components of the two vectors are both an odd number, and main scanning direction components of the two vectors are an odd number and an even number, respectively.

26. An image processing system comprising:
a halftone processing unit configured to apply halftone processing for generating a halftone dot based on a dither matrix to image data;
a correction unit configured, with respect to the image data to which the halftone processing has been applied, to shift a pixel of the image data in a sub-scanning direction based on correction information for correcting a distortion due to a curve of a scanning line for forming an image according to the image data; and
a resolution conversion unit configured to apply resolution conversion processing with a two-pixel sampling interval in a main scanning direction and a three-pixel sampling interval in the sub-scanning direction to the corrected image data to generate image data having a converted resolution,
wherein the dither matrix includes information about two vectors representing an arrangement of the halftone dot, and
wherein neither of sub-scanning direction components of the two vectors is divisible by the sampling interval in the sub-scanning direction.

27. An image processing system comprising:
a halftone processing unit configured to apply halftone processing for generating a halftone dot based on a dither matrix to image data;
a correction unit configured, with respect to the image data to which the halftone processing has been applied, to shift a pixel of the image data in a sub-scanning direction based on correction information for correcting a distortion due to a curve of a scanning line for forming an image according to the image data; and a resolution conversion unit configured to apply resolution conversion processing with a P-pixel sampling interval in a main scanning direction and a Q-pixel sampling interval in the sub-scanning direction to the corrected image data to generate image data having a converted resolution, wherein the dither matrix includes information about two vectors representing an arrangement of the halftone dot, wherein a main scanning direction component and a sub-scanning direction component of one of the two vectors are respectively x1 and y1 pixels, and a main scanning direction component and a sub-scanning direction component of the other of the two vectors are respectively x2 and y2 pixels, and wherein, as the main scanning direction component and the sub-scanning direction component of each of the two vectors, there is at least one combination of integers n and m which satisfy the following congruence relation:

$$nx_1 + mx_2 \equiv 0 \pmod{P}$$

$$ny_1 + my_2 + 1 \equiv 0 \pmod{Q} \qquad \text{[Formula 2]}.$$

\* \* \* \* \*